United States Patent
Sakai et al.

(10) Patent No.: US 7,174,307 B2
(45) Date of Patent: Feb. 6, 2007

(54) GIFT MEDIATING METHOD AND A COMPUTER PRODUCT

(75) Inventors: Noriko Sakai, Kawasaki (JP); Seiji Shimoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 872 days.

(21) Appl. No.: 09/785,220

(22) Filed: Feb. 20, 2001

(65) Prior Publication Data

US 2002/0049811 A1   Apr. 25, 2002

(30) Foreign Application Priority Data

Oct. 19, 2000   (JP)   ............................. 2000-320017

(51) Int. Cl.
    *G06Q 30/00*   (2006.01)
(52) U.S. Cl. .................................................. 705/26
(58) Field of Classification Search ................. 705/26, 705/27
    See application file for complete search history.

(56) References Cited

U.S. PATENT DOCUMENTS

| 5,555,496 | A | * | 9/1996 | Tackbary et al. .............. 705/27 |
| 5,965,860 | A | * | 10/1999 | Oneda ......................... 235/382 |
| 6,321,211 | B1 | * | 11/2001 | Dodd ........................... 705/26 |
| 6,865,546 | B1 | * | 3/2005 | Song .............................. 705/26 |
| 7,013,292 | B1 | * | 3/2006 | Hsu et al. ..................... 705/37 |
| 2002/0016734 | A1 | * | 2/2002 | McGill et al. ................. 705/14 |
| 2002/0032605 | A1 | * | 3/2002 | Lee .............................. 705/14 |
| 2002/0095298 | A1 | * | 7/2002 | Ewing ............................ 705/1 |
| 2002/0116257 | A1 | * | 8/2002 | Helbig ........................ 706/14 |

FOREIGN PATENT DOCUMENTS

| JP | 09-062627 | 3/1997 |
| JP | 11-003375 | 1/1999 |
| JP | 11-165739 | 6/1999 |
| JP | 2000-099592 | 4/2000 |
| JP | 2000-242711 | 9/2000 |
| JP | 2002-024603 | 1/2002 |
| JP | 2002-032681 | 1/2002 |
| JP | 2002109326 | * 4/2002 |

OTHER PUBLICATIONS

U.S. Appl. No. 60/209,647, filed Jun. 5, 2000.*
U.S. Appl. No. 60/235,856, filed Sep. 27, 2000.*
Custome.com, "Custome.com website opens the custom category to consumers; Custome.com offers sellers of custom products the services the most targeted marketing oportunity ever on the internet", Business wire, Apr. 4, 2000.*

(Continued)

*Primary Examiner*—Mark Fadok
(74) *Attorney, Agent, or Firm*—Staas & Halsey LLP

(57) ABSTRACT

A sender-related control section accepts a gift order from a sender-side client set to the sender side of a gift and a receiver-related control section provides the information about gift orders to a receiver-side client set to the receiver side of the gift concerned are used. The receiver-related control section accepts change of the gift concerned from the receiver-side client and stores the change history information about the receiver in a gift-change-control database. The sender-related control section provides gift-change-history information to the sender-side client when a gift is ordered.

3 Claims, 26 Drawing Sheets

OTHER PUBLICATIONS

BusinessWire, RICHFX., creator of breakthrough computer generated video technology for e-commerce, acquires Atlanta based blue rock and its proprietary online giftmail service, dated May 16, 2000.*

Hudson, Kris, Frogmagic leaps onto internet boulder entrepreneur starts online gift-giving company, Denver Rocky Mountain News, dated Aug. 15, 2000.*

BravoGifts.com, Holiday shopping relief in "site"! Bravogifts.com is the perfect place to find brilliant holiday business gifts, Businesswire, Nov. 22, 1999.*

Japanese Office Action issued in corresponding Japanese Patent Application No. 2000-320017.

* cited by examiner

FIG.2A 100 MEMBER CONTROL DATABASE

| MEMBER ID | PASSWORD | NAME | ADDRESS | MAIL ADDRESS | CARD NUMBER | BEST-GIFT OPENING FLAG | WORST-GIFT OPENING FLAG |
|---|---|---|---|---|---|---|---|
| 001 | **** | TARO AKASAKA | 2-3, AKASAKA 1-CHOME, CHIYODA-KU | taro@xxx.com | 12345 | YES | YES |
| 002 | **** | HANAKO OSAKA | 5-6, 4-CHOME, MINATO-KU, OSAKA | - | 24680 | YES | NO |
| 003 | **** | KAZUO MATSUMOTO | 8-9, IRIYAMABE 7-CHOME, MATSUMOTO-SHI | kazu@zzz.co.jp | 98765 | NO | ONLY 001, 002,007 |
| 004 | **** | JIRO HAKATA | 4-6, 2-CHOME, HAKATA-KU, FUKUOKA-SHI | - | 13579 | - | - |

FIG.2B 110 GIFT COMMODITY DATABASE

| COMMODITY ID | SPECIFICATION | THUMBNAIL FILE | PRICE |
|---|---|---|---|
| A-STORE DRINK ASSORTMENT | CHEMICAL-FREE ORANGE... | A1.gif | ¥3,000 |
| B-STORE TABLEWARE SET | MADE IN FRANCE... | B1.gif | ¥5,500 |
| A-STORE BEST LAVER | TEN-LAVER SET... | A2.gif | ¥8,000 |
| C-STORE FINE-NOODLE-BUNDLE SET | FIVE-BUNDLE SET | C1.gif | ¥1,500 |

FIG.2C 120 GIFT CONTROL DATABASE

| GIFT ID | RECEIVER ID | SENDER ID | KIND OF COMMODITY | COMMODITY ID | NUMBER OF COMMODITIES | SCHEDULED DELIVERY DATE | LETTER-OF-APPRECIATION/ REJECTION ID | REJECTION FLAG |
|---|---|---|---|---|---|---|---|---|
| 2000115 | 001 | 002 | SUMMER GIFT | A-STORE DRINK ASSORTMENT | 1 | 2000/7/15 | C-01 | |
| 2000116 | 003 | 002 | SUMMER GIFT | B-STORE TABLEWARE SET | 1 | - | | |
| 2000117 | 001 | 003 | PRESENT | A-STORE BEST LAVER | 1 | 2000/7/17 | | |
| 2000119 | 001 | 004 | SUMMER GIFT | C-STORE FINE-NOODLE-BUNDLE SET | 1 | 2000/7/14 | X-01 | ○ |

FIG.3A

130 ; GIFT-CHANGE CONTROL DATABASE

| CHANGE ID | GIFT ID | RECEIVER ID | ORIGINAL COMMODITY ID | NEW COMMODITY ID | CHANGE DATE |
|---|---|---|---|---|---|
| H01 | 1999288 | 001 | A-STORE BEER ASSORTMENT | A-STORE DRINK ASSORTMENT | 1999/7/20 |
| H02 | 1999363 | 002 | C-STORE FOUNTAIN PEN | C-STORE SCARF | 1999/12/5 |
| H03 | 2000044 | 001 | A-STORE BEST LAVER | A-STORE WINE SET | 2000/7/5 |
| | | | | | |

FIG.3B

140 ; LETTER-OF-APPRECIATION/REJECTION STANDARDIZED-SENTENCE DATABASE

| KIND OF GIFT | LETTER-OF-APPRECIATION/REJECTION ID | STANDARDIZED-SENTENCE DATA |
|---|---|---|
| SUMMER GIFT | C-01 | TANK YOU VERY MUCH FOR YOUR EXCELLENT GIFT... |
| SUMMER GIFT | C-02 | THANK YOU VERY MUCH FOR YOUR CONSIDERATION.... |
| YEAR-END GIFT | S-01 | THANK YOU VERY MUCH FOR YOUR EXCELLENT GIFT... |
| NEW YEAR'S GREETINGS | N-01 | THANK YOU VERY MUCH FOR YOUR EXCELLENT NEW YEAR'S GIFT... |
| CONGRATULATORY PRESENT | I-01 | THANK YOU VERY MUCH FOR YOUR UNEXPECTED PRESENT... |
| RETURN | X-01 | THOUGH I RECEIVED AN EXCELLENT GIFT,... |
| RETURN | X-02 | BECAUSE I CANNOT RECEIVE THIS COMMODITY,... |
| | | |

FIG.12

| | | |
|---|---|---|
| NAME | | |
| ADDRESS | | ⎫ |
| MAIL ADDRESS | | ⎬ 211 |
| CARD NUMBER | | ⎭ |

SHALL THE BEST GIFT BE DISCLOSED?   ☑ YES  ☐ NO  ☐ ONLY SPECIFIC MEMBER

ID OF THE SPECIFIC MEMBER [____] — 212

SHALL THE WORST GIFT BE DISCLOSED?   ☑ YES  ☐ NO  ☐ ONLY SPECIFIC MEMBER

ID OF THE SPECIFIC MEMBER [____] — 213

REGISTRATION — 214

<GENERAL GIFT LIST>

| <SELECTION> | <COMMODITY ID> | <PRICE> | |
|---|---|---|---|
| ☑ | A-STORE DRINK ASSORTMENT | ¥3,000 | DETAILS 241₁ |
| ☐ | B-STORE TABLEWARE SET | ¥5,500 | DETAILS 241₂ |
| ☐ | A-STORE BEST LAVER | ¥8,000 | DETAILS |
| ☐ | C-STORE FINE-NOODLE SET | ¥1,500 | DETAILS |

242 SELECTION

243
<A-STORE DRINK ASSORTMENT> DETAIL INFORMATION

THUMBNAIL IMAGE 244
¥3,000

CHEMICAL-FREE 100%-ORANGE JUICE    FIVE 500-ML BOTTLES  ⎫
                                                          ⎬ 245
CHEMICAL-FREE 100%-APPLE JUICE     FIVE 500-ML BOTTLES   ⎭

246 SELECTION

A-STORE DRINK ASSORTMENT" SENT FROM MS. HANAKO OSAKA

SCHEDULED DELIVERY DATE, 2000/07/15

☑ SCHEDULED DELIVERY DATE IS CHANGED TO
THE FOLLOWING DATE

CHANGED SCHEDULED DELIVERY DATE : | 2000/09/30 | 291

☐ SCHEDULED DELIVERY DATE IS NOT DESIGNATED

| DECISION | 292

FIG.24

LETTER OF REJECTION TO MR. JIRO HAKATA (RETURN)

- ☐ TYPE 1: THOUGH I RECEIVED AN EXCELLENT GIFT...
- ☑ TYPE 2: BECAUSE I CANNOT ACCEPT THIS GIFT...

[RETURN]

FIG.25

LETTER OF REJECTION TO MR. JIRO HAKATA (RETURN: TYPE 1)

★THIS LETTER OF REJECTION WILL BE DELIVERED BY A MAIL

BECAUSE I CANNOT ACCEPT THIS GIFT...

[DECISION]

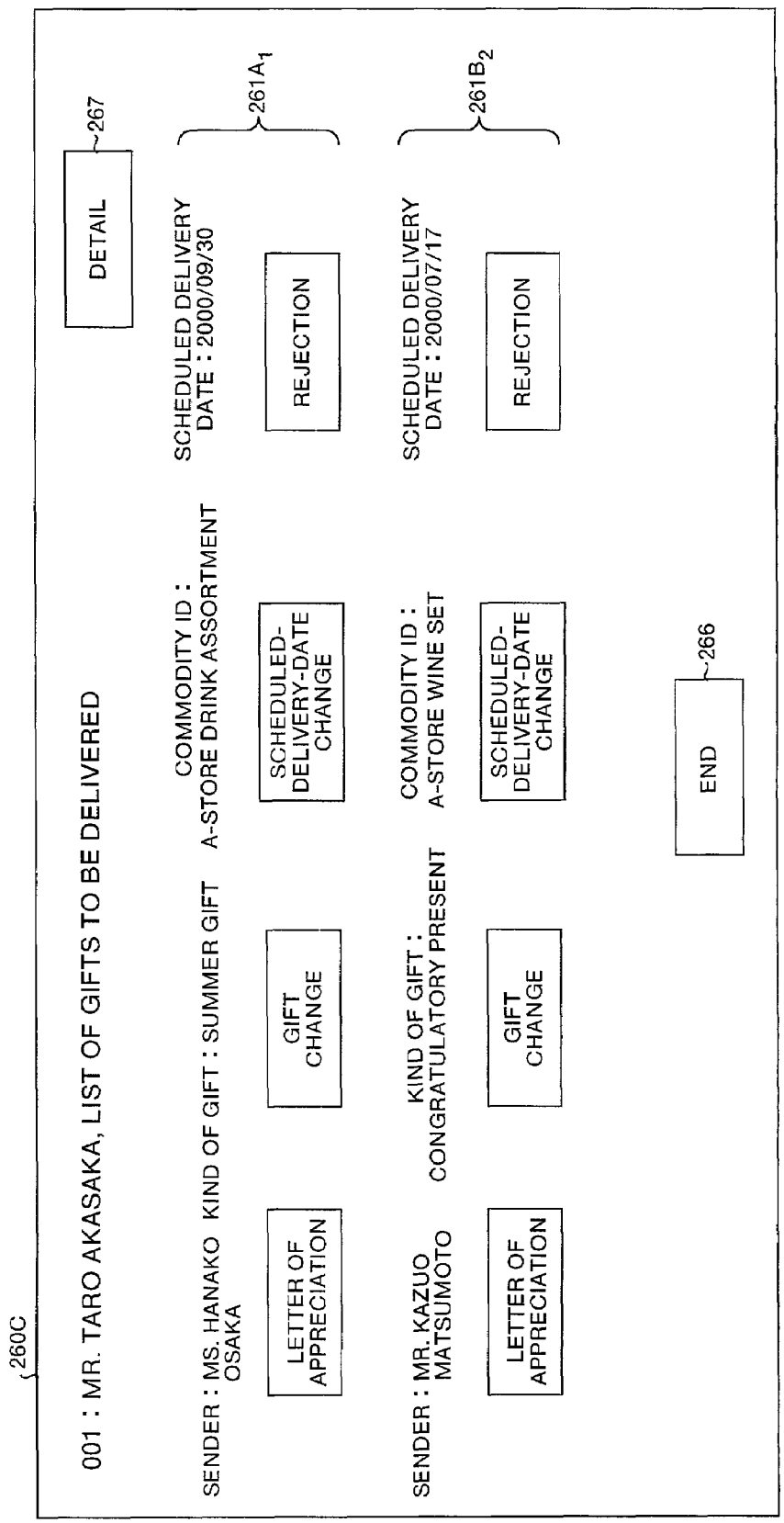

001 : MR. TARO AKASAKA,　DETAIL OF GIFTS TO BE DELIVERED (FOR JULY, 2000)

| | |
|---|---|
| 1 | SENDER : MS. HANAKO OSAKA<br><br>KIND OF GIFT : SUMMER GIFT　　COMMODITY ID : A-STORE　　SCHEDULED DELIVERY DATE : 2000/07/15<br>　　　　　　　　　　　　　　　　　DRINK ASSORTMENT<br><br>→SENDING OF LETTER OF APPRECIATION (SUMMER GIFT: TYPE 1)<br>→SCHEDULED DELIVERY DATE : TO BE CHANGED TO 2000/9/30 |
| 2 | SENDER : MR. KAZUO MATSUMOTO<br><br>KIND OF GIFT :　　　　　　　　COMMODITY ID : A-STORE　　SCHEDULED DELIVERY DATE : 2000/07/17<br>CONGRATULATORY PRESENT　　BEST LAVER<br><br>→TO BE CHANGED TO A-STORE WIND SET |
| 3 | SENDER : MR. JIRO HAKATA<br><br>KIND OF GIFT : SUMMER GIFT　　COMMODITY ID : C-STORE　　SCHEDULED DELIVERY DATE : 2000/07/14<br>　　　　　　　　　　　　　　　　　FINE-NOODLE SET<br><br>→REJECTION<br>→SENDING OF LETTER OF REJECTION (RETURN: TYPE 1) |

GIFT MEDIATING METHOD AND A COMPUTER PRODUCT

FIELD OF THE INVENTION

The present invention relates to a gift mediating method used to mediate a gift on-line and a computer-readable recording medium storing a gift mediating program, particularly to a gift mediating method capable of improving the convenience and profitability of a sender, receiver, and seller of a gift and a computer-readable recording medium storing a gift mediating program.

BACKGROUND OF THE INVENTION

A gift has been sent so far from a sender to a receiver in accordance with customs such as a summer gift, year-end gift, and New Year's card. In general, a sender selects a desired gift out of various kinds of gifts in a department store or the like while estimating the taste of a receiver in an allowable price range and sends a selected gift to the receiver.

However, the gift selected by the sender is not always useful for the receiver. In this case, a problem occurs that the sent gift is very wasteful because it is not used by the receiver at all or it embarrasses the receiver. Therefore, means and a method for effectively solving the problem have been earnestly desired so far.

In a gift season for summer gifts or year-end gifts, a gift corner has been set so far in a department store (seller side) in which various kinds of gifts such as drinks, dairy products, and marine products have been arranged. A sender selects a gift at the gift corner and presents the selected gift to a receiver via a distributor by using the sending service of the department store. Then, the receiver receiving the gift from the distributor sends a letter of appreciation to the sender through communication means such as a telephone or postcard.

The custom of presenting a gift is one important factor for keeping a smooth human relation. Realistically, however, a gift sender, gift receiver, and gift seller respectively have the following problem.

That is, a sender has a problem that he (or she) must go to a department store and select a desired gift out of various kinds of gifts at the department store. Therefore, a problem occurs that this is very troublesome for the sender. Particularly, because many senders come with a rush in a gift season, there is no time for each sender to steadily select a gift. As a result, even when there are a plurality of receivers, the sender selects the same gifts.

Moreover, a problem occurs that a gift is very unprofitable because, even if the gift is sent to a receiver with much effort, the receiver does not use the gift since the gift is not suitable for the taste of the receiver and it is difficult to use the gift.

In this case, there are some department stores that respectively provide a service in which an unnecessary gift can be replaced with other useful gift. However, replacement of a gift is very troublesome for a receiver because the receiver must go to the department store of the gift and perform a complex replacement procedure.

Moreover, when a receiver is absent at a gift delivery date, the receiver must request redelivery of the gift to the distributor of the gift. That is, because a receiver have not been able to receive a gift so far in accordance with his (her) condition, this has been lacking in convenience. In this case, there may be a receiver who wants to reject a gift sent from an unfavorable sender. In this case, however, it has been difficult to reject the gift so far because the gift has been delivered by a distributor.

Moreover, a receiver receiving a gift generally gives thanks to the sender through communication means such as a telephone or postcard. In fact, however, a problem occurs that a mental burden is forced on a receiver because communication is troublesome for the receiver or it takes a lot of time for communication as the number of gifts increases.

Furthermore, a store in a gift season has a problem that costs such as labor cost and space cost increase because it is necessary to secure a space for setting a gift corner and increase the number of store clerks and moreover, operations (replacement, stock control, and sales control) due to gift replacement requests increase. Moreover, the delivery cost increases when a receiver is absent.

SUMMARY OF THE INVENTION

It is an object of this invention is to provide a gift mediating method capable of improving the convenience and profitability of a sender, receiver, and seller of a gift. It is another object of this invention to provide a computer readable recording medium that stores a computer program which when executed realizes the method according to the present invention.

The gift mediating method according to one aspect of this invention comprises a receiver corresponding step of providing the gift order information sent from the sender of the gift to a receiver-side client set to the receiver side of the gift, a gift change step of storing the gift change information about change of the gift supplied from the receiver-side client, and a sender corresponding step of providing the gift change information corresponding to the receiver to a sender-side client set to the sender side when the sender-side client executes gift order processing for the receiver.

According to the above-mentioned aspect, the gift change information about a receiver is stored and the gift change information is provided to a sender-side client when a gift is ordered. Therefore, it is possible to confirm the trend of the taste of the receiver in accordance with the gift change information and thereby, it is possible to improve the convenience and profitability of a sender, receiver, and seller of a gift by avoiding an unnecessary gift from being presented.

The gift mediating method according to another aspect of this invention comprises a receiver corresponding step of providing the gift order information sent from the sender of the gift to a receiver-side client set to the receiver side of the gift, a letter-of-appreciation accepting step of accepting a letter of appreciation to be sent to the sender from the receiver, and a letter-of-appreciation sending step of sending a letter of appreciation to the sender-side client at least in the form of electronic data.

According to the above-mentioned aspect, because a letter of appreciation addressed to a sender from a receiver is accepted and sent to a sender-side client at least in the form of electronic data, it is possible to improve the convenience of the receiver.

The gift mediating method according to still another aspect of this invention comprises a receiver corresponding step of providing the gift order information supplied from the sender to a receiver-side client set to the receiver side of the gift, a letter-of-rejection accepting step of accepting a letter of rejection for rejecting the gift sent from the sender, and a letter-of-rejection sending step of sending the letter of rejection to the sender-side client at least in the form of electronic data.

According to the above-mentioned aspect, because a letter of rejection for rejecting a gift sent from a sender is accepted and sent to a sender-side client at least in the form of electronic data, it is possible to electronically record and control that the receiver does not receive the gift, reduce the mental burden of the receiver due to rejection of the gift, and avoid an unnecessary delivery.

The gift mediating method according to still another aspect of this invention comprises a gift-designation accepting step of accepting a designation of the receiver of the gift, a transmitting step of transmitting the information about the receiver, and a receiving step of receiving the information about a gift suitable for the receiver among the gift change information about change of gifts presented to the receiver in the past.

According to the above-mentioned aspect, because the information of a gift suitable for the receiver concerned is received out of the gift change information, it is possible to confirm a gift liked by the receiver and thereby, avoid an unnecessary gift from being presented, and improve the convenience and profitability of a sender, receiver, and seller of the gift.

The gift mediating method according to still another aspect of this invention comprises a gift-designation accepting step of accepting a designation of the receiver of the gift, a transmitting step of transmitting the information about the receiver, and a receiving step of receiving the information of a gift not suitable for the receiver among the gift change information about change of gifts presented to the receiver in the past.

According to the above-mentioned aspect, because the information of a gift not suitable for the receiver concerned is received out of the gift change information, it is possible to confirm a gift not liked by the receiver. Therefore, it is possible to avoid an unnecessary gift from being presented and improve the convenience and profitability of a sender, receiver, and seller of a gift.

The gift mediating method according to still another aspect of this invention comprises a receiving step of receiving the gift order information including the information about the sender of the gift to be presented to the receiver, a designation accepting step of accepting a designation of a letter-of-appreciation transmitting destination out of the received gift order information, and a transmitting step of transmitting the designation information showing that the letter of appreciation is transmitted in accordance with the designation.

According to the above-mentioned aspect, because the designation information showing that a letter of appreciation is transmitted from a receiver to a sender is transmitted, it is possible to improve the convenience of the receiver about sending of the letter of appreciation.

The gift mediating method according to still another aspect of this invention comprises a receiving step of receiving the gift order information including the information about the sender of the gift to be presented to the receiver, a designation accepting step of accepting a designation for rejecting the gift out of the received gift order information, and a transmitting step of transmitting the designation information showing that the gift is rejected in accordance with the designation.

According to the above-mentioned aspect, because the designation information showing that a gift presented from a sender is rejected is transmitted, it is possible to reduce the mental burden of a receiver due to rejection of the gift and avoid unnecessary delivery of the gift.

The computer readable recording medium according to another aspect of the present invention stores a computer program which when executed realizes the method according to the present invention.

Other objects and features of this invention will become apparent from the following description with reference to the accompanying drawings.

BRIEF DESCRIPTION OF THE DRAWINGS

FIGS. 2A to FIG. 2C are illustrations showing table structures of various databases of the embodiment in FIG. 1;

FIGS. 3A and FIG. 3B are illustrations showing table structures of various databases of the embodiment in FIG. 1;

FIG. 12 is an illustration showing one of member registration screens 210 of the embodiment in FIG. 1;

FIG. 15 is an illustration showing one of general-gift-list screens 240 of the embodiment in FIG. 1;

FIG. 20 is an illustration showing one of scheduled-delivery-date change screens 290 of the embodiment in FIG. 1;

FIG. 24 is an illustration showing one of letter-of-rejection edition screens 310 of the embodiment in FIG. 1;

FIG. 25 is an illustration showing one of confirmation screens 320 of the embodiment in FIG. 1;

FIG. 26 is an illustration showing one of gift list screens 260C of the embodiment in FIG. 1;

FIG. 27 is an illustration showing one of detail screens 330 of the embodiment in FIG. 1.

DESCRIPTION OF THE PREFERRED EMBODIMENTS

A preferred embodiment of a gift mediating method and a computer-readable recording medium storing a gift-mediating program of the present invention is described below in detail by referring to the accompanying drawings.

Figure 1:
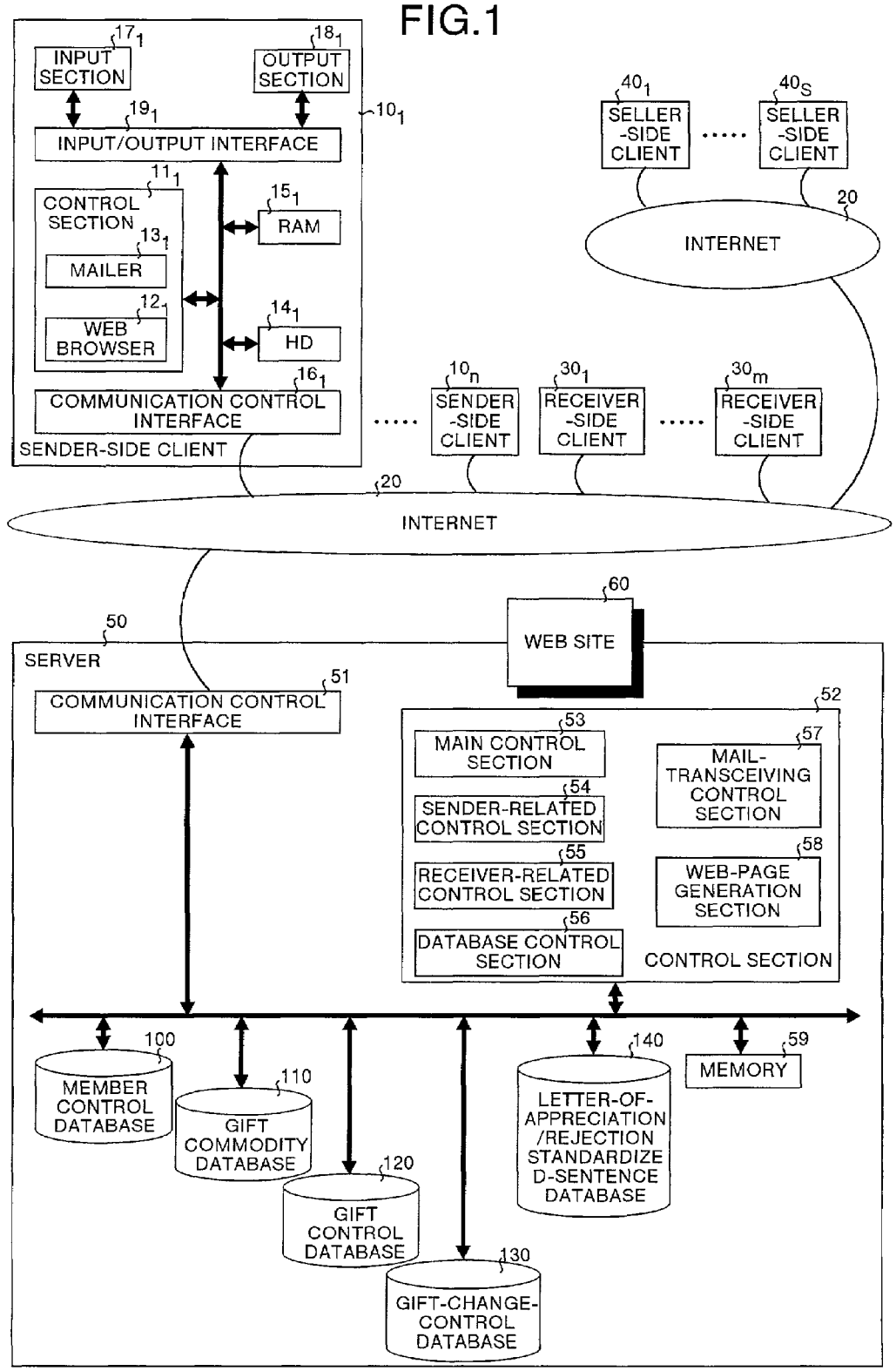
FIG. 1 is a block diagram showing a configuration of an embodiment of the present invention.

FIG. 1 is a block diagram showing a configuration of an embodiment of the present invention. In FIG. 1, sender-side clients 101 to 10n denote n computer systems to be operated by a sender of a gift, which is connected to Internet 20 through communication systems such as a modem, terminal adapter, and router and a telephone line (or leased line). These sender-side clients 101 to 10n are used for on-line order of a gift through a gift-mediating Web site 60 by accessing a server 50 to be described later through the Internet 20 in accordance with TCP/IP (Transmission Control Protocol/Internet Protocol).

In the sender-side client 101, a control section 111 controls various sections and has a Web browser 121 and a mailer 131. The Web browser 121 obtains the data for Web pages from the server 50 through the Internet 20 in accordance with an URL (Uniform Resource Locator) input from an input section 171 and performs the display control of interpreting the data and making an output section 181 display the data. The input section 171 is an input device such as a keyboard or mouse. The output section 181 is an output device such as a display or printer.

The mailer 131 is a program for generating an electronic mail or transceiving an electronic mail in accordance with POP 3 (Post Office Protocol version 3) or SMTP (Simple Mail Transfer Protocol). An HD (hard disk drive) 141 is a large-capacity recording medium to record computer programs and various data values.

A RAM (Random Access Memory) 151 is a recording medium in or from which data can be written or read and is accessed by the control section 111. A communication control interface 161 controls the communication with the Internet 20 in accordance with the above-described TCP/IP. An input/output interface 191 serves as an interface between the input section 171 and output section 181 on one hand and various sections on the other. Other sender-side clients 102 (not illustrated) to 10n are constituted similarly to the sender-side client 101.

Receiver-side clients 301 to 30m are m computer systems set to the receiver side of a gift, which is connected to the Internet 20 through communication system such as a modem, terminal adapter, and router and a telephone line (or leased line). These receiver-side clients 301 to 30m are used to confirm a gift, change scheduled delivery dates, edit a letter of appreciation or rejection, and change gifts through the Web site 60 by accessing a server 50 to be mentioned later through the Internet 20 in accordance with TCP/IP. Moreover, the receiver-side clients 301 to 30m are constituted similarly to the sender-side client 101.

Seller-side clients 401 to 40s are s computers set to the seller side (such as a department store) of a gift, which are connected to the Internet 20 through communication systems such as a modem, terminal adapter, and router and a telephone line (or leased line). These seller-side clients 401 to 40s are used to register a gift and control the order and shipment of a gift by accessing a server 50 to be mentioned later through the Internet 20 in accordance with TCP/IP. Moreover, the seller-side clients 401 to 40s are constituted similarly to the sender-side client 101.

The server 50 is connected to the Internet 20 through a not-illustrated fire wall or router and accessed by the above sender-side clients 101 to 10n, receiver-side clients 301 to 30m, and seller-side clients 401 top 40s. The server 50 functions as a gift mediating system for mediating a gift between three parties of a sender, receiver, and seller through the Web site 60.

In the case of the server 50, a communication control interface 51 controls the communication with the Internet 20 in accordance with TCP/IP. A control section 52 controls various sections, which is constituted of a main control section 53, sender-related control section 54, receiver-related control section 55, database control section 56, mail-transceiving control section 57, and Web-page generating section 58. The main control section 53 controls various sections and certifies a member or not by using an ID and a password to be mentioned later when the server 50 is logged in.

The sender-related control section 54 executes processing related to a sender. In this case, gift ordering for accepting an order of a gift from a sender is listed as the sender-related processing. The receiver-related control section 55 executes receiver-related processings. The receiver-related processings include gift confirmation, letter-of-appreciation acceptance, gift change, scheduled delivery-date change, and gift rejection.

The gift confirmation is a processing for a receiver to confirm a sender, gift content, or scheduled delivery date. The letter-of-appreciation acceptance is a processing for accepting a letter of appreciation sent from a receiver to a sender. The gift change is a processing for changing a gift presented from a sender to other gift on-line before the gift is actually delivered when the gift is not suitable for the taste of the receiver. The scheduled delivery date change is a processing for a receiver to change a scheduled gift delivery date to another date before the gift is actually delivered because of certain reasons of the receiver. The gift rejection is a processing for rejecting a gift sent from a sender.

The database control section 56 controls accesses to a member control database 100, gift commodity database 110, gift control database 120, gift-change control database 130, and letter of appreciation/rejection standardized-sentence database 140. Details of these member control database 100, gift commodity database 110, gift control database 120, gift-change control database 130, and letter of appreciation/rejection standardized-sentence database 140 are will be described later.

The mail-transceiving control section 57 controls an address of an electronic mail to be transferred between the sender-side clients 101 to 10n, receiver-side clients 301 to 30m and seller-side clients 401 to 40s and generates a mail format. The Web-page generating section 58 generates a Web page to be read by the sender-side clients 101 to 10n, receiver-side clients 301 to 30m, and seller-side clients 401 to 40s. The storing section 59 is a hard disk drive to store various data values in accordance with the control of the main control section 53.

The member control database 100 is a database for storing the member information about members (sender and receiver). Specifically, the member control database 100 has fields of "member ID", "password", "name", "address", "mail address", "card number", "best-gift opening flag", and "worst-gift opening flag" as shown in FIG. 2A.

"Member ID" denotes an identifier for identifying a member. "Pass word" is used to certify that a person who logs in the server 50 is a formal member. "Name" denotes the information about the name of a member. "Address" denotes the information about the address of a member. "Mail address" denotes the information about the address of an electronic mail for communication with a member. "Card number" denotes the information about the number for a credit card used for settlement of accounts when a gift is ordered.

"Best-gift opening flag" denotes a flag showing whether the information about a gift liked by a receiver (referred to as best gift) is opened to a sender currently selecting a gift, which is set by a member when the member is registered. That is, when opening the information about a best gift to a sender, "Yes" is set to "best gift flag". However, when not opening the information about the best gift to the sender, "No" is set to "best gift flag".

"Worst-gift opening flag" is a flag showing whether to open the information about a gift (worst gift) not liked by a receiver to a sender currently selecting a gift, which is set by a member when the member is registered. That is, when opening the information about the worst gift to a sender, "Yes" is set to "worst gift". However, when not opening the information to the sender, "No" is set to "worst gift". Moreover, in the case of an embodiment, the information about a best gift and a worst gift can be opened only to specific members.

The information about the best gift and worst gift is generated in accordance with the change history of gifts of a receiver and shows the trend of the taste of the receiver. That is, the information about the best and worst gifts serves as a criterion for a sender to select a gift, which is used as the information for avoiding the above problems due to presentation of a gift not liked by a receiver.

In FIG. 1, the gift commodity database 110 is a database for storing the information about gift commodities registered by the seller-side clients 40₁ to 40s. Specifically, the gift commodity database 110 has fields of "commodity ID", "specification", "thumbnail file", and "price" as shown in FIG. 2B.

"Commodity ID" denotes an identifier for identifying a store and a gift commodity and is constituted of "store name" and "gift commodity name". For example, "A-store drink assortment" denotes store name=A store and gift commodity name=drink assortment. "Specification" denotes the information about the specification of a gift commodity. "Thumbnail file" denotes the information about the file name of a thumbnail image of a gift commodity. "Price" denotes the information about the selling price of a gift commodity.

In FIG. 1, the gift control database 120 is a database for storing the control information of a gift ordered from a sender. Specifically, the database 120 has fields of "gift ID", "receiver ID", "sender ID", "kind of commodity", "commodity ID", "number of gifts", "scheduled delivery date", "letter of appreciation/rejection ID", and "rejection flag" as shown in FIG. 2C.

"Gift ID" denotes an identifier for specifying a gift ordered from a sender. "Receiver ID" denotes an identifier for identifying a sender, which corresponds to "member ID" of the member control database 100 (refer to FIG. 2A). "Sender ID" denotes an identifier for identifying a sender, which corresponds to "member ID" of the member control database 100 (refer to FIG. 2A). "Kind of commodity" denotes the information about the kind of a commodity.

"Commodity ID" corresponds to "commodity ID" of the gift commodity database 110 (refer to FIG. 2B). "Number of gifts" denotes the information about the number of gifts to be presented to the same receiver. "Scheduled delivery date" denotes the information about a scheduled delivery date for delivering a gift to a receiver. "Letter of appreciation/rejection ID" denotes an identifier for identifying a letter of appreciation or a letter of rejection to be sent from a receiver to a sender. "Rejection flag" denotes a flag (shown by "O" in FIG. 2C) showing that a gift to be sent from a sender to a receiver is rejected before the gift is actually delivered to the receiver.

In FIG. 1, the gift-change control data base 130 is a database for storing the gift-change control information when the gift is changed to other gift on-line before the gift is actually delivered to a receiver because the gift is not suitable for the taste of the receiver. Specifically, the gift-change control database 130 has fields of "change ID", "gift ID", "receiver ID", "original commodity ID", "new commodity ID", and "change date" as shown in FIG. 3A.

"Change ID" denotes an identifier for identifying the gift-change control information. "Gift ID" corresponds to "gift ID" of the gift control database 120 (refer to FIG. 2C). "Receiver ID" denotes an identifier for identifying a receiver who changes gifts. "Original commodity ID" denotes an identifier for identifying a gift commodity before changed and corresponds to "commodity ID" of the gift control database 120 (refer to FIG. 2C). "New commodity ID" denotes an identifier for identifying a changed gift commodity. "Change date" denotes the data for a date on which gifts are changed.

In FIG. 1, the letter-of-rejection standardized-sentence database 140 is a database for storing the standardized-sentence data for a letter of rejection from a receiver to a sender. Specifically, the letter-of-rejection standardized-sentence database 140 has fields of "type", "letter of appreciation/rejection ID", and "standardized-sentence data" as shown in FIG. 3B.

"Type" denotes the information about the type of a letter of appreciation and the type of a letter of rejection. IN FIG. 1, "summer gift", "year-end gift", "New Year's greetings", and "celebration" correspond to a letter of appreciation. "Return" corresponds to a letter of rejection. "Letter of rejection ID" denotes an identifier for identifying a letter of appreciation/rejection. "Standardized-sentence data" denotes the data for a standardized sentence to be entered in a letter of appreciation/rejection and has the content corresponding to "Type".

Then, operations of the above embodiment are described below by referring to flowcharts shown in FIGS. 4 to 10 and screen examples shown in FIGS. 11 to 27. When the server 50 shown in FIG. 1 is accessed, the main control section 53 displays a top screen 200 shown in FIG. 11 on the output section of the client concerned. An ID input space 201, password input space 202, log-in button 203, member registration button 204, sender-dedicated-screen button 205, receiver-dedicated-screen button 206, and end button 207 are displayed on the top screen 200.

Figure 4:
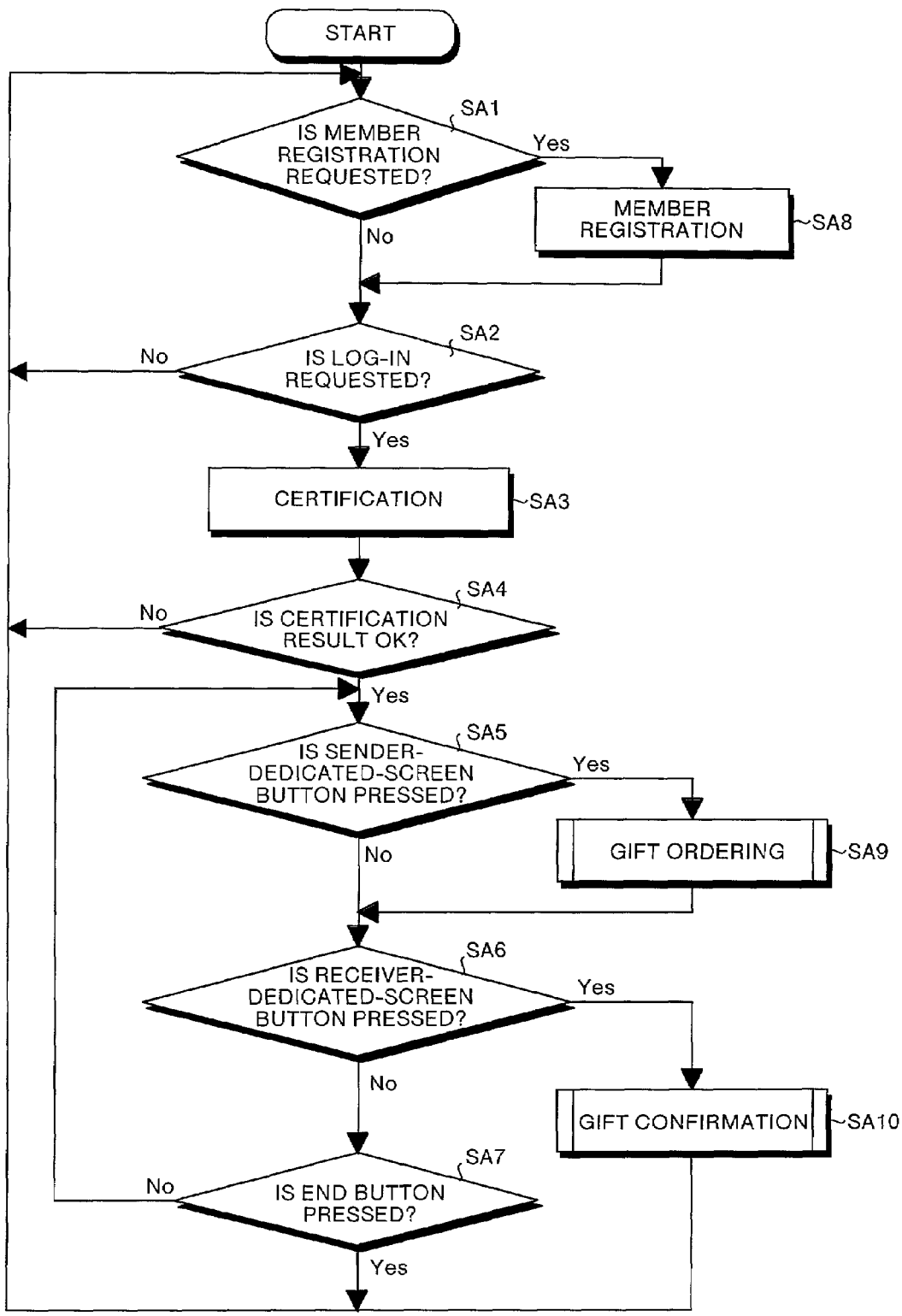
FIG. 4 is a flowchart for explaining operations of the embodiment in FIG. 1.
Figure 5:
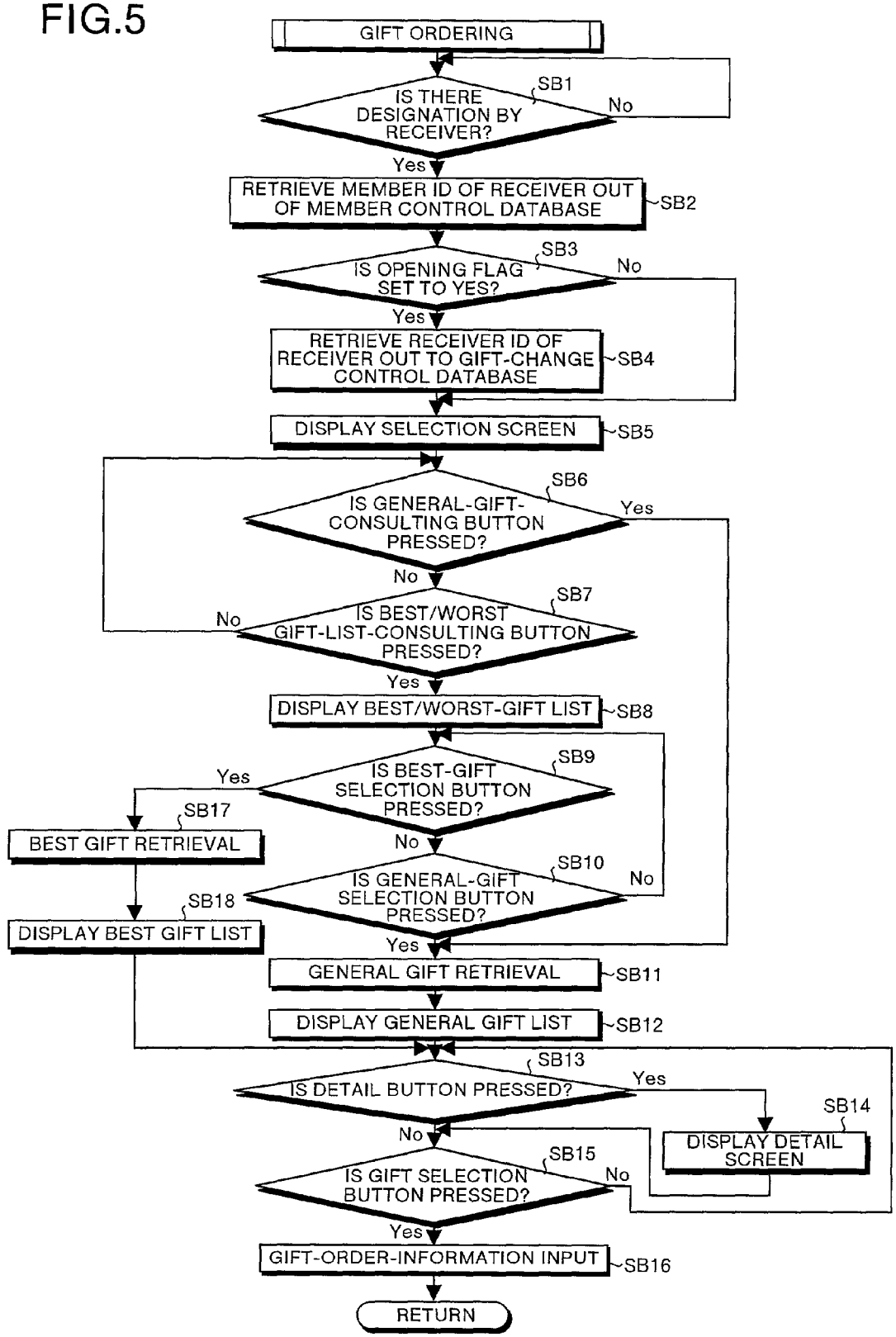
FIG. 5 is a flowchart for explaining the gift ordering in FIG. 4.

In this case, determinations in steps SA1, SA2, and SA4 to SA7 shown in FIG. 4 are performed by the server 50. In step SA1, it is determined whether member registration is requested, that is, the member registration button 204 is pressed. When the determination result is "No", the determination in step SA2 is performed.

In step SA2, it is determined whether log-in is requested, that is, the log-in button 203 is pressed when a member ID and a password are input to the ID input space 201 and password input space 202. When the determination result is "No", the determination in step SA1 is performed. However, when the determination result in step SA2 is "Yes", the member control database 100 is consulted in step SA3 and certification is performed in accordance with the above member ID and password.

In step SA4, it is determined whether the certification result is OK. When the determination result is "No", the determination in step SA1 is performed. However, when the determination result in step SA4 is "Yes", the determination in step SA5 is performed. It is determined in step SA5 whether the sender-dedicated-screen button 205 is pressed by a sender. When the determination result is "No", the determination in step SA6 is performed.

In step SA6, it is determined whether the receiver-dedicated-screen button 206 is pressed by a receiver. When the determination result is "No", the determination in step SA7 is performed. It is determined in step SA7 whether the end button 207 is pressed. When the determination result is "No", the determination in step SA5 is performed. However, when the determination result in step SA7 is "Yes", the determination in step SA1 is performed.

In this case, when the member registration button 204 is pressed by a member candidate through a client, the main control section 53 sets the determination result in step SA1 to "Yes" to execute the member registration in step SA8. Specifically, the main control section 53 displays the member registration screen 210 shown in FIG. 12 on the output section of the client of the member candidate.

Thereby, the member candidate inputs information to a member-information input space 211, best-gift-opening-flag setting space 212, and worst-gift-opening-flag setting space 213 on the member registration screen 210. Each piece of the information input to the member information input space 211 to word-gift-opening-flag setting space 213 corresponds to each field (but except password) of the member control database 100 shown in FIG. 2A. Then, when a registration button 214 is pressed, the main control section 53 stores the input information in the member control database 100 (refer to FIG. 2A).

Then, a case is described in which a sender orders a gift. In this case, the sender inputs his (or her) member ID and password to the ID input space 201 and password input space 202 shown in FIG. 11 by operating the sender-side client 101 and then, presses the log-in button 203. Thereby, the main control section 53 sets the determination result in step SA2 to "Yes". In step SA3, the main control section 53 executes certification. In step SA4, the main control section 53 determines whether the certification result is OK and in this case, sets the determination result to "Yes".

Then, when the sender-dedicated-screen button 205 is pressed by a sender, the main control section 53 sets the determination result in step SA5 to "Yes". In step SA9, the sender-related control section 54 executes gift ordering. That is, in step SB1 shown in FIG. 5, the sender-related control section 54 determines whether a gift receiver is designated by the sender. When the determination result is "No", the sender-related control section 54 repeats the above determination.

In this case, when a receiver is designated by the sender, the sender-related control section 54 sets the determination result in step SB1 to "Yes". To designate a receiver, a method is used which designates a receiver out of a list of receivers displayed on the Web site 60. In step SB2, the sender-related control section 54 retrieves the member ID of a receiver out of the member control database 100.

In step SB3, the sender-related control section 54 determines whether the opening flag (best-gift opening flag or worst-gift opening flag) of the receiver concerned (member) in the member control database 100 indicates "Yes". When the determination result is "No", the sender-related control section 54 executes the processing in step SB5. However, when the determination result in step SB3 is "Yes", the sender-related control section 54 retrieves a receiver ID out of the gift-change control database 130 (refer to FIG. 3A) in step SB4.

Figure 13:
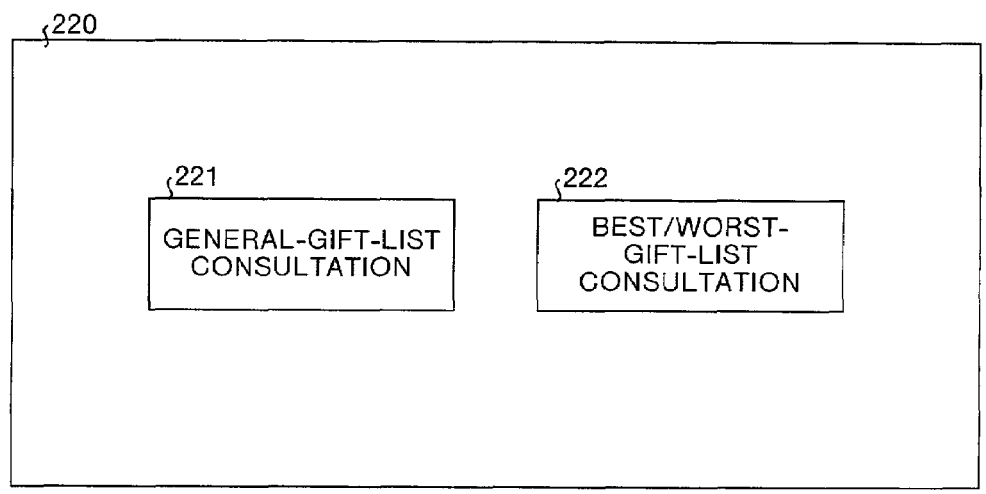
FIG. 13 is an illustration showing one of selection screens 220 of the embodiment in FIG. 1.

In step SB5, the sender-related control section 54 displays the selection screen 220 shown in FIG. 13 on the output section 18 of the sender-side client 101. A general-gift-list-consulting button 221 and a best/worst-gift-list-consulting button 222 are displayed on the selection screen 220. In step SB6, the sender-related control section 54 determines whether the general-gift-list-consulting button 221 is pressed. When the determination result is "Yes", the sender-related control section 54 executes the processing in step SB11.

However, when the determination result in step SB6 is "No", the sender-related control section 54 determines in step SB7 whether the best/worst-gift-list-consulting button 222 is pressed. When the determination result is "No", the sender-related control section 54 executes the determination in step SB6. In this case, when the best/worst-gift-list-consulting button 222 is pressed, the sender-related control section 54 sets the determination result in step SB7 to "Yes".

Figure 14:
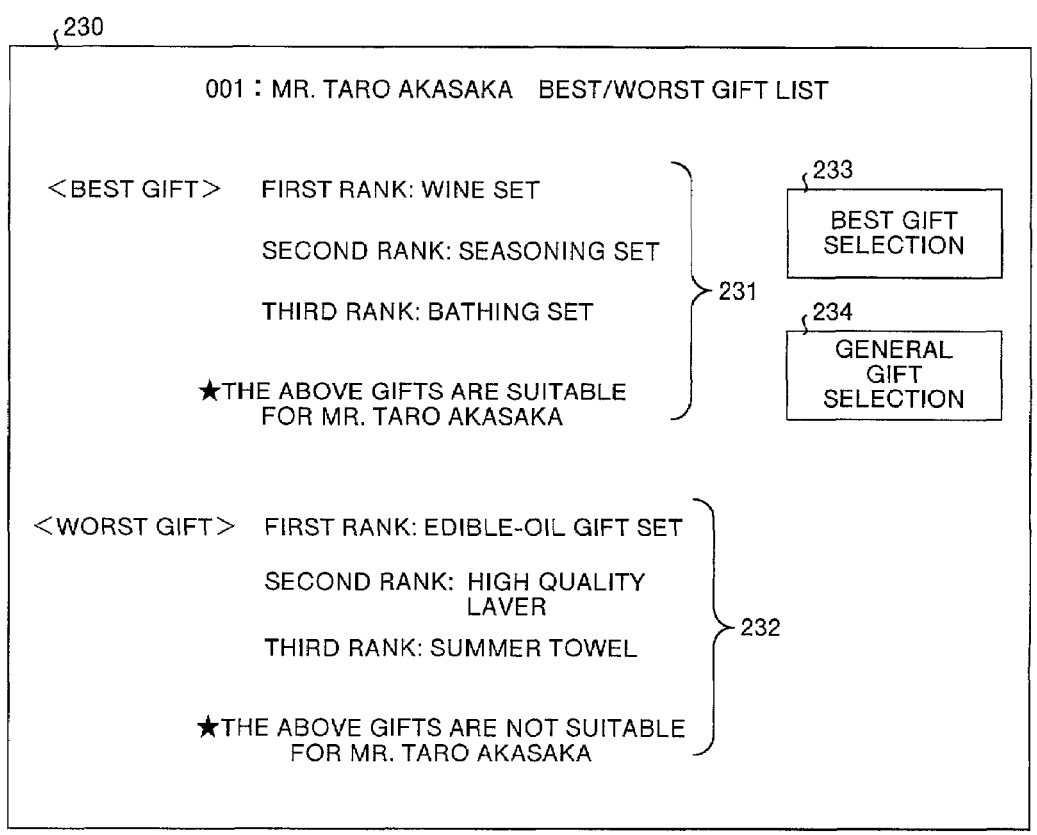
FIG. 14 is an illustration showing one of best/worst-gift-list screens 230 of the embodiment in FIG. 1.

In step SB8, the sender-related control section 54 displays the best/worst-gift-list screen 230 shown in FIG. 14 on the output section 181 of the sender-side client 101. The best-gift information 231 and worst-gift information 232 about the above-described best gift and worst gift for a receiver (Taro Akasaka in the case of FIG. 14) are displayed on the best/worst-gift-list screen 230.

These best-gift information 231 and worst-gift information 232 are generated in accordance with the gift-change control information about the receiver concerned in the gift-change control database 130 shown in FIG. 3A. That is, because it is possible to regard a gift corresponding to "original commodity ID" as a gift not suitable for the taste of a receiver, the gift is regarded as the worst gift. However, because it is possible to regard a gift corresponding to "new commodity ID" as a gift suitable for the taste of a receiver, the gift is regarded as the best gift. The order of the worst gift and best gift is decided in accordance with higher appearance frequency of "original commodity ID" and higher appearance frequency of "new commodity ID".

A sender can confirm a gift suitable or not suitable for a receiver in accordance with the best/worst-gift-list screen 230. Instep SB9, the sender-related control section 54 determines whether a best-gift selection button 233 is pressed. When the determination result is "No", the sender-related control section 54 executes the determination in step SB10. In step SB10, the sender-related control section 54 determines whether a general-gift selection button 234 is pressed. When the determination result is "No", the sender-related control section 54 executes the determination in step SB9.

In this case, when the general-gift selection button 234 is pressed, the sender-related control section 54 sets the determination result in step SB10 to "Yes" and executes the processing in step SB11. When the general-gift-list-consulting button 221 (refer to FIG. 13) is pressed, the sender-related control section 54 sets the determination result in step SB6 to "Yes" and executes the processing in step SB11.

In step SB11, the sender-related control section 54 executes the general-gift retrieval of extracting optional information from the gift commodity database 110. In this case, a general gift denotes a gift independent of the relation with the taste of a receiver. In step SB12, the sender-related control section 54 displays the general-gift-list screen 240 shown in FIG. 15 on the output section 181 of the sender-side client 101 in accordance with the retrieved general-gift information.

A selection check box, commodity ID, price, and detail buttons 2411 and 2412 are displayed on the general-gift-list screen 240. In step SB13, the sender-related control section 54 determines whether a detail button is pressed. When the determination result is "No", the sender-related control section 54 executes the determination in step SB15. In this case, when the detail button 2411 for displaying the detail information about A-store drink assortment is pressed, the sender-related control section 54 sets the determination result in step SB13 to "Yes".

In step SB14, the sender-related control section 54 displays the detail information screen 243 shown in FIG. 15 on the output section 181 of the sender-side client 101 based on "specification", "thumbnail file", and "price" of the gift commodity database 110 (refer to FIG. 2B).

A thumbnail image 244 about A-store drink assortment, price, and specification 245 are displayed on the detail information screen 243. In step SB15, the sender-related control section 54 determines whether a gift selection buttons (246 or 242) is pressed. When the determination result is "No", the sender-related control section 54 executes the determination in step SB13.

However, when the best-gift selection button 233 shown in FIG. 14 is pressed, the sender-related control section 54 sets the determination result in step SB9 to "Yes". In step SB17, the sender-related control section 54 retrieves the gift commodity database 110 (refer to FIG. 2B) by using the best gift information 231 as a key to extract best-gift information.

Figure 16:
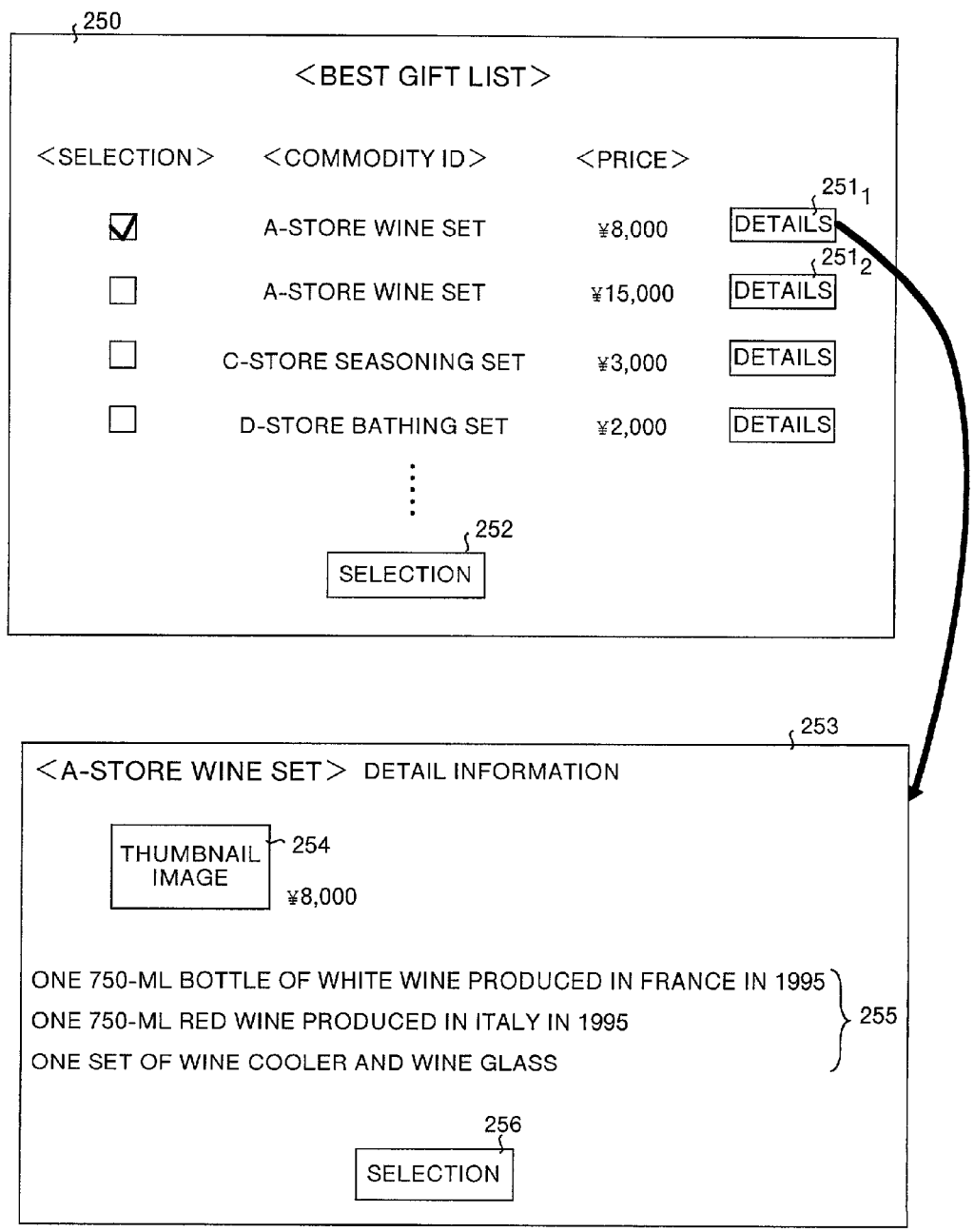
FIG. 16 is an illustration showing one of best-gift-list screens 250 of the embodiment in FIG. 1.

In step SB18, the sender-related control section 54 displays the best-gift-list screen 250 shown in FIG. 16 on the output section 181 of the sender-side client 101 in accordance with the best gift information. A selection check box, commodity ID, price, and detail buttons 2511 and 2512 are displayed on the best-gift-list screen 250 similarly to the case of the general-gift-list screen 240 (refer to FIG. 15). However, because the commodity ID displayed on the best-gift-list screen 250 relates to a gift liked by a receiver, the receiver may be pleased at the gift almost without fail.

In step SB13, the sender-related control section 54 determines whether a detail button is pressed. When the determination result is "No", the sender-related control section 54 executes the determination in step SB15. In this case, when the detail button 2511 for displaying the detail information about A-store wine set is pressed, the sender-related control section 54 sets the determination result in step SB13 to "Yes".

In step SB14, the sender-related control section 54 displays the detail information screen 253 shown in FIG. 16 on the output section 181 of the sender-side client 101. A thumbnail image 254 about A-store wine set, price, and specification 255 are displayed on the detail information screen 253.

In step SB15, the sender-related control section 54 determines whether a gift selection button (in this case, a gift selection button 252 or 256) is pressed. When the determination result is "No", the sender-related control section 54 executes the determination in step SB13. In this case, when the gift selection button 256 is pressed, the sender-related control section 54 sets the determination result in step SB15 to "Yes".

In step SB16, the sender-related control section 54 displays a gift-order-information input screen (not illustrated) about gift order information on the output section 181 of the sender-side client 101. The gift order information includes the information about the selected gifts shown in FIG. 2C (in this case, best gifts), the information about a receiver, kind of gift, number of gifts, and scheduled delivery date.

Then, when an order button (not illustrated) on the gift-order-information input screen is pressed, the sender-related control section 54 stores gift order information in the gift control database 120 shown in FIG. 2C. Moreover, the sender-related control section 54 accepts the order of the gift concerned. Thereby, the mail-transceiving control section 57 transmits order information to the seller-side client 401 through an electronic mail. The seller side executes a series of processings such as securing, delivery arrangement, and settlement of accounts of an ordered gift.

Moreover, the mail-transceiving control section 57 communicates that a gift is ordered by a sender to the mail address of a receiver through an electronic mail. However, when the receiver is not provided with a mail address, it is communicated to the receiver that a gift is ordered through means such a post card.

Figure 11:
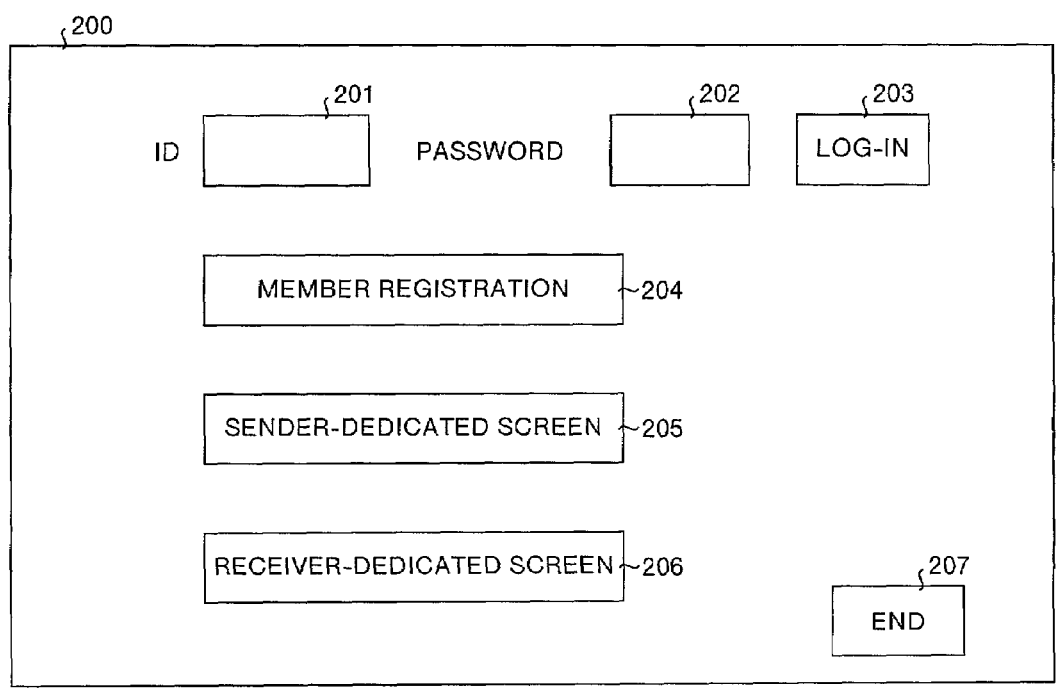
FIG. 11 is an illustration showing one of top screens 200 of the embodiment in FIG. 1.

Then, the receiver receiving the above notification accesses the server 50 by operating the receiver-side client 301. Thereby, the top screen 200 shown in FIG. 11 is displayed on the output section (not illustrated) of the receiver-side client 301. Thereafter, the receiver undergoes the certification of the member ID and password similarly to the case of the above sender and then, presses the receiver-dedicated-screen button 206. In the case of an embodiment, it is not always necessary to notify a receiver that a gift is ordered by a sender and it is also allowed for the receiver to properly confirm whether there is a gift addressed to the receiver.

Thereby, the main control section 53 sets the determination result in step SA6 shown in FIG. 4 to "Yes". In step SA10, the receiver-related control section 55 executes the gift confirmation for a receiver to confirm the information about the gift concerned. That is, in step SC1 shown in FIG. 6, the receiver-related control section 55 retrieves the gift control database 120 by using the receiver ID of the receiver concerned as a key and obtains the gift control information corresponding to the receiver. Moreover, in the case of an embodiment, it is not always necessary to notify a receiver that a gift is ordered by a sender. It is also allowed for the receiver to properly confirm whether there is a gift addressed to the receiver.

Figure 17:
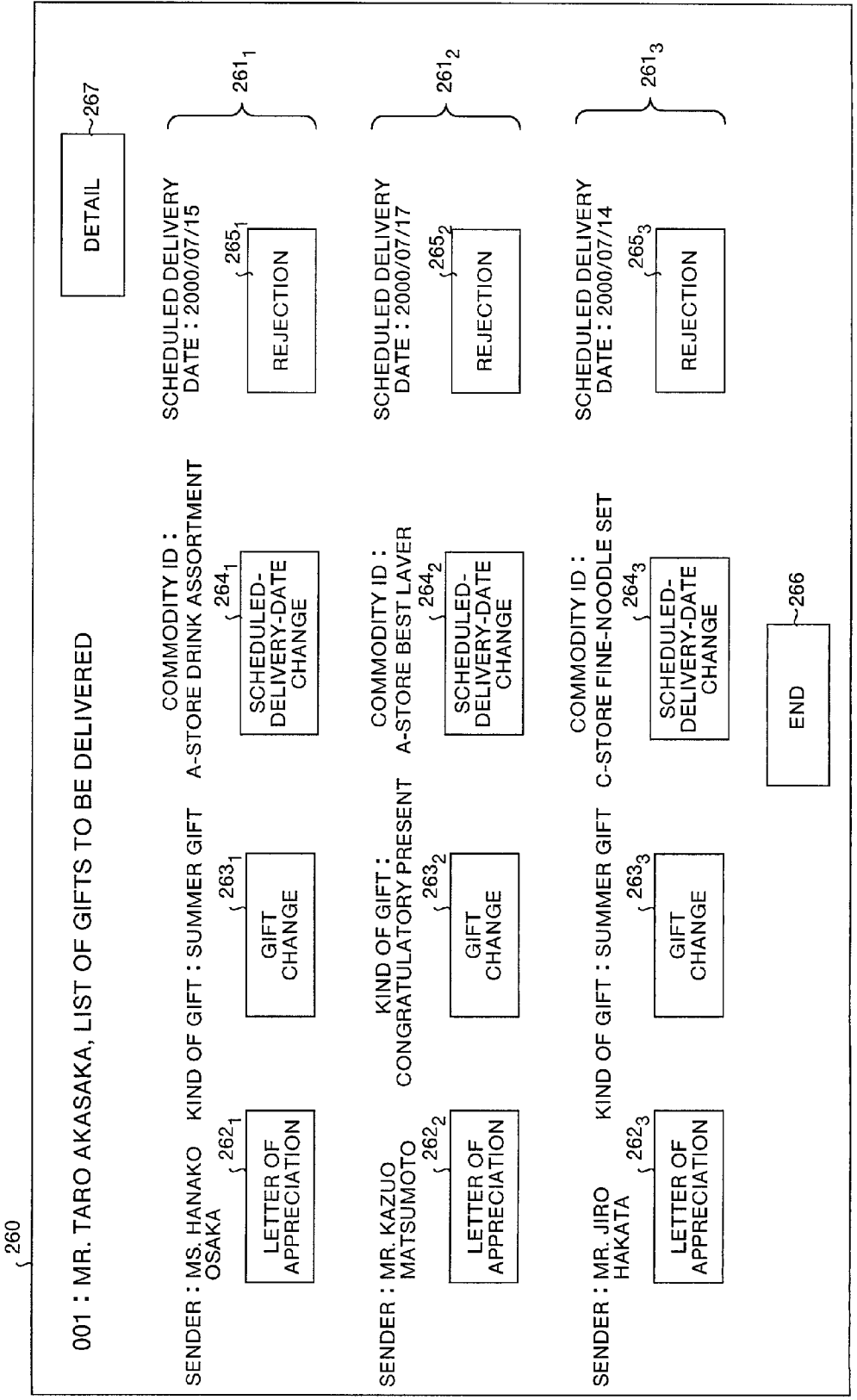
FIG. 17 is an illustration showing one of gift-list screens 260 of the embodiment in FIG. 1.

In step SC2, the receiver-related control section 55 displays the gift list screen 260 shown in FIG. 17 on the output section of the receiver-side client 301 in accordance with the gift control information corresponding to the receiver concerned. A list of gifts presented to the receiver concerned (in this case, Taro Akasaka) is displayed on the gift list screen 260. In the case of the example shown in FIG. 17, it is found that three senders (Hanako Osaka, Kazuo Matsumoto, and Jiro Hakata) respectively send a gift to the receiver (Taro Akasaka).

Gift information 2611 comprises pieces of information about kinds of gifts: summer gift, commodity ID: A-store drink assortment, and scheduled delivery date corresponding to a sender (Hanako Osaka). A letter-of-appreciation acceptance button 2621 is a button for accepting a letter of appreciation sent from a receiver (Taro Akasaka) to a sender (Hanako Osaka).

A gift change button 2631 is a button for changing a gift (A-store drink assortment) sent from the sender (Hanako Osaka) to other gift. A scheduled-delivery-date change button 2641 is a button for changing the scheduled delivery date of the gift concerned to other date in accordance with circumstances of the receiver (Taro Akasaka) A rejection button 2651 is a button for rejecting a gift sent from the sender (Hanako Osaka) in accordance with circumstances of the receiver (Taro Akasaka).

Moreover, gift information 2612 comprises the information about kind of commodity: present, commodity ID: A-store best layer, and scheduled delivery date, corresponding to the sender (Kazuo Matsumoto). A letter-of-appreciation acceptance button 2622 is a button for accepting a letter of appreciation to be sent from the receiver (Taro Akasaka) to the sender (Kazuo Matsumoto).

A gift change button 2632 is a button for changing a gift (A-store best layer) sent from the sender (Kazuo Matsumoto) to other gift. A scheduled-delivery-date change button 2642 is a button for changing the scheduled delivery date of the gift concerned to other date in accordance with circumstances of the receiver (Kazuo Matsumoto). A rejection button 2652 is a button for rejecting a gift sent from the sender (Kazuo Matsumoto) in accordance with circumstances of the receiver (Taro Akasaka).

Moreover, gift information 2613 comprises the information about kind of gift: summer gift, commodity ID: C-store fine-noodle-bundle set, and scheduled delivery date, corresponding to the sender (Jiro Hakata). A letter-of-appreciation acceptance button 2623 is a button for accepting a letter of appreciation to be sent from the receiver (Taro Akasaka) to the sender (Jiro Hakata).

A gift change button 2633 is a button for changing a gift (C-store fine-noodle-bundle set sent from the sender (Jiro Hakata) to other gift. A scheduled-delivery-date change button 2643 is a button for changing the scheduled delivery date of the gift concerned to other date in accordance with circumstances of the receiver (Taro Akasaka) A rejection button 2653 is a button for rejecting a gift sent from the sender (Jiro Hakata) in accordance with circumstances of the receiver (Taro Akasaka). An end button 266 is a button for ending the gift confirmation. A detail-screen button 267 is a button for displaying a detail screen of the detail information about a gift.

Figure 6:
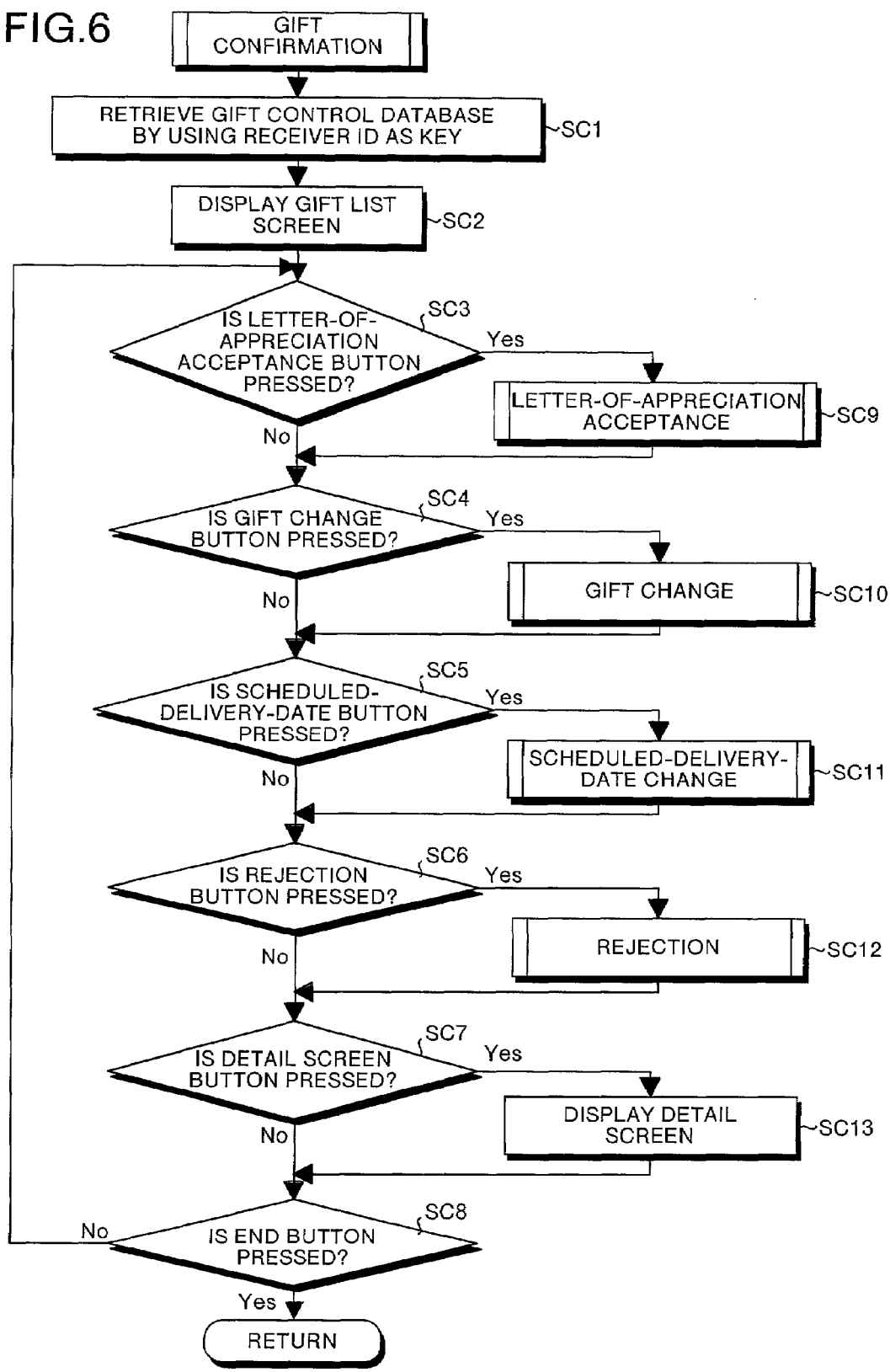
FIG. 6 is a flowchart for explaining the gift confirmation in FIG. 4.

Hereafter, the receiver-related control section 55 executes determinations in steps SC3 to SC8 shown in FIG. 6. That is, in step SC3, it is determined whether the letter-of-appreciation acceptance buttons (letter-of-appreciation acceptance button 2621 to 2623 shown in FIG. 17) are pressed. When the determination result is "No", the determination in step SC4 is performed. In step SC4, it is determined whether the gift change buttons (gift change button 2631 to 2633) are pressed. When the determination result is "No", the determination in step SC5 is performed.

In step SC5, it is determined whether the scheduled-delivery-date change buttons (scheduled-delivery-date change button 2641 to 2643) are pressed. When the determination result is "No", the determination in step SC6 is performed. In step SC6, it is determined whether the rejection buttons (rejection button 2651 to 2653) are pressed. When the determination result is "No", the determination in step SC7 is performed. In step SC7, it is determined whether the detail-screen button 267 is pressed. When the determination result is "No", the determination in step SC8 is performed. In step SC8, it is determined whether the end button 266 is pressed. When the determination result is "No", the determination in step SC3 is performed.

In this case, when the letter-of-appreciation button 2621 shown in FIG. 17 is pressed by the receiver (Taro Akasaka), the receiver-related control section 55 sets the determination result in step SC3 to "Yes". In step SC9, the receiver-related control section 55 executes the letter-of-appreciation acceptance.

Figure 7:
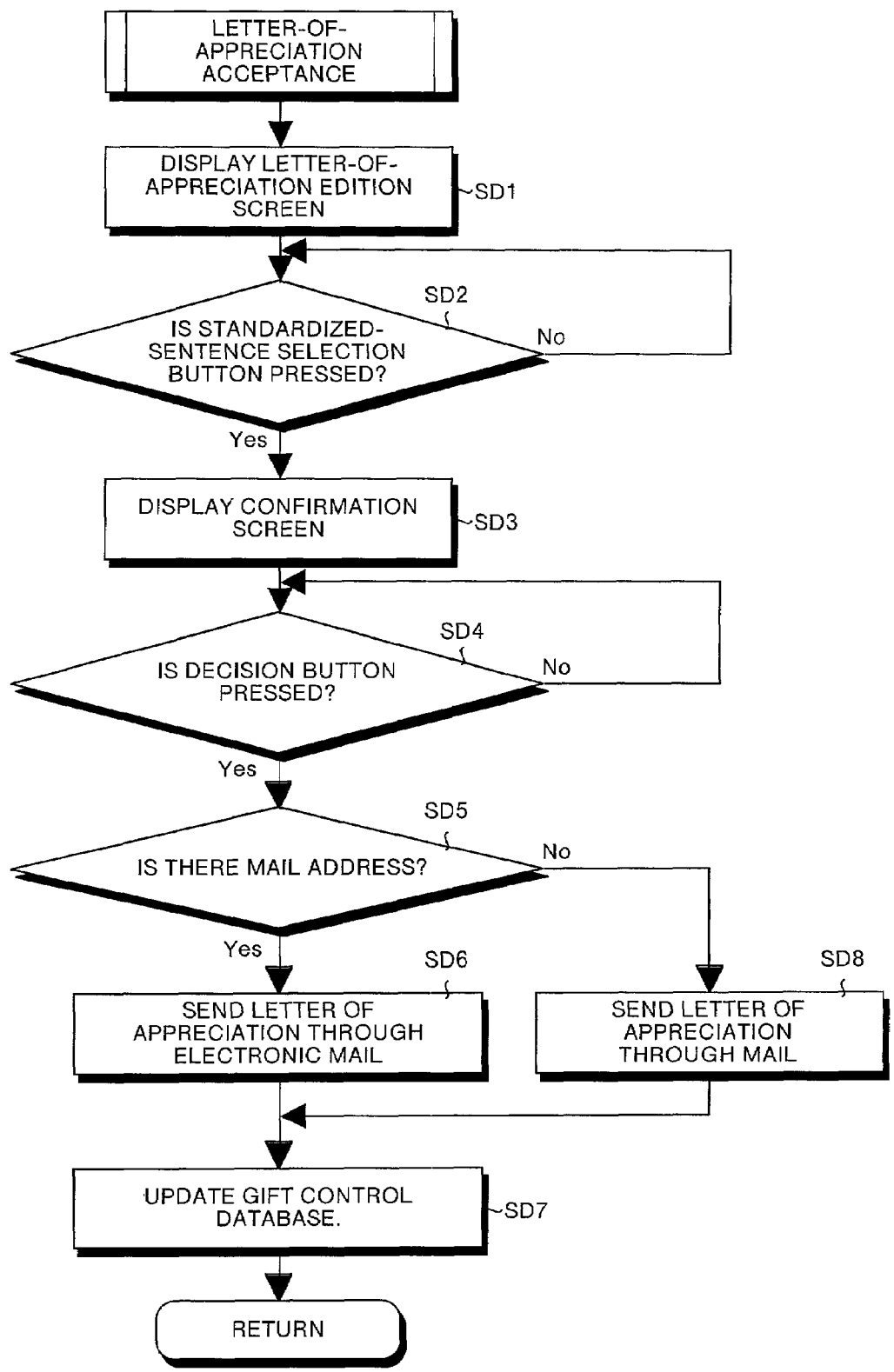
FIG. 7 is a flowchart for explaining the letter-of-appreciation acceptance in FIG. 6.
Figure 18:
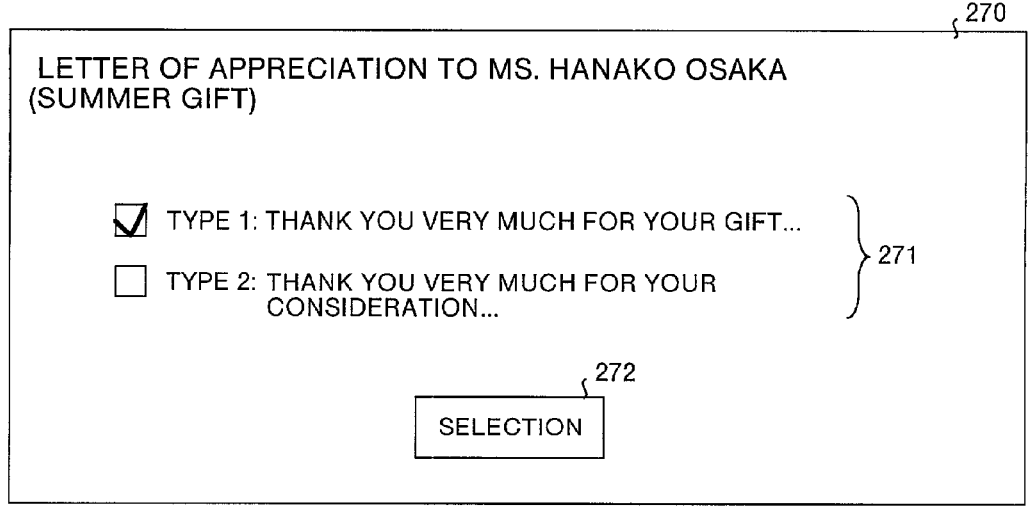
FIG. 18 is an illustration showing one of letter-of-appreciation edition screens 270 of the embodiment in FIG. 1.

That is, in step SD1 shown in FIG. 7, the receiver-related control section 55 extracts the standardized-sentence data corresponding to a letter of appreciation from the letter of appreciation/rejection standardized-sentence database 140 shown in FIG. 3B and then, displays the letter-of-appreciation edition screen 270 shown in FIG. 18 on the output section of the receiver-side client 301 in accordance with the standardized-sentence data. The letter-of-appreciation edition screen 270 is a screen for selecting a standardized sentence to be entered in a letter of appreciation (summer gift) addressed to the sender (Hanako Osaka) out of a plurality of standardized sentences 271. The standardized sentences 271 correspond to "standardized-sentence data" of the letter-of-appreciation/rejection standardized-sentence database 140 shown in FIG. 3B.

In step SD2, the receiver-related control section 55 determines whether a standardized-sentence selection button 272 is pressed after the standardized-sentence check box is checked. When the determination result is "No", the receiver-related control section 55 repeats the above determination. Then, when the check box of a standardized sentence "type 1: Thank your very much for your excellent gift . . . " shown in FIG. 3B is checked by the receiver (Taro Akasaka) and thereafter the standardized-sentence selection button 272 is pressed, the receiver-related control section 55 sets the determination result in step SD2 to "Yes".

Figure 19:
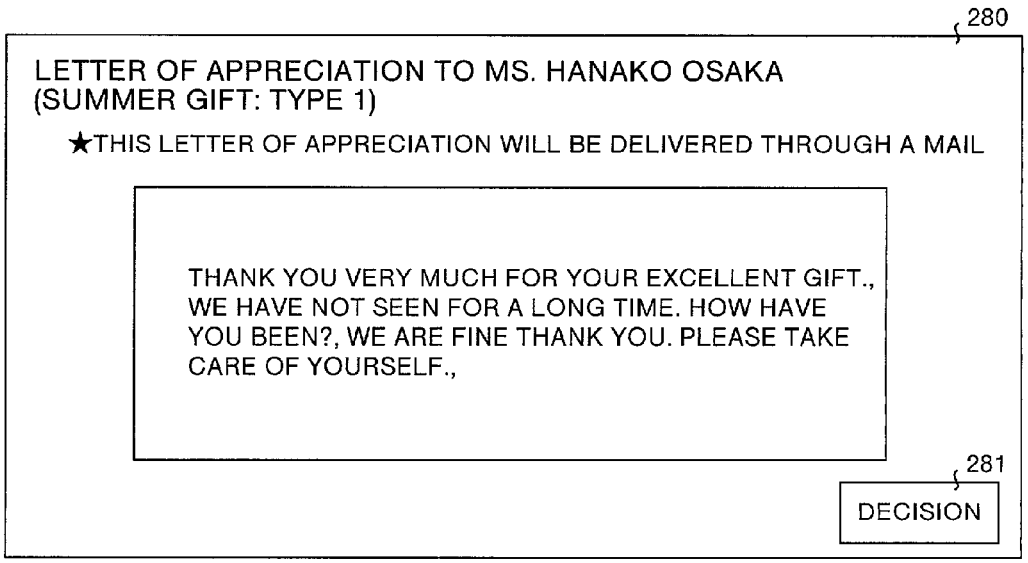
FIG. 19 is an illustration showing one of confirmation screens 280 of the embodiment in FIG. 1.

In step SD3, the receiver-related control section 55 displays the confirmation screen 280 shown in FIG. 19 on the output section of the receiver-side client 301. The confirmation screen 280 is a screen for confirming the contents of a letter of appreciation generated in accordance with the standardized sentence selected in step SD2. In this case, it is also possible to edit the displayed standardized sentence by the italic words shown in FIG. 19. In step SD4, the receiver-related control section 55 determines whether a decision button 281 is pressed by the receiver (Taro Akasaka). When the determination result is "No", the receiver-related control section 55 repeats the above determination.

In this case, when the decision button 281 is pressed, the receiver-related control section 55 sets the determination result in step SD4 to "Yes". In step SD5, the receiver-related control section 55 retrieves the member control database 100 to determine whether there is the mail address of the sender (Hanako Osaka).

In this case, when it is assumed that there is the mail address, the receiver-related control section 55 sets the determination result in step SD5 to "Yes". In step SD6, the mail-transceiving control section 57 sends the letter of appreciation confirmed through the confirmation screen 280 to the sender-side client (Hanako Osaka) through an electronic mail. However, when the determination result in step SD5 is "No", the letter of appreciation is sent through a mail in step SD8.

In step SD7, the receiver-related control section 55 stores information in "letter of appreciation/rejection ID" of the gift control database 120 shown in FIG. 2C and updates the gift control database 120.

Then, when the scheduled-delivery-date change button 2641 shown in FIG. 17 is pressed by the receiver (Taro Akasaka), the receiver-related control section 55 sets the determination result in step SC5 shown in FIG. 6 to "Yes". In step SC11, the receiver-related control section 55 executes the scheduled delivery data change. That is, in step SF1 shown in FIG. 9, the receiver-related control section 55 displays the scheduled-delivery-date change screen 290 shown in FIG. 20 on the output section of the receiver-side client 301.

The scheduled-delivery-date change screen 290 is a screen for changing the scheduled delivery data of the gift (A-store drink assortment) sent from the sender (Hanako Osaka) in accordance with circumstances of the receiver (Taro Akasaka). In step SF2, the receiver-related control section 55 determines whether the decision button 292 is pressed. When the determination result is "No", the receiver-related control section 55 repeats the above determination.

In this case, when the check box showing "scheduled delivery date is changed to the following date" is checked by the receiver (Taro Akasaka) and "2000/09/30" is input to a changed-scheduled-delivery-date input space 291 and thereafter the decision button 292 is pressed, the receiver-related control section 55 sets the determination result in step SF2 to "Yes". That is, the receiver (Taro Akasaka) changed the scheduled delivery date of the gift concerned from "2000/07/15" to "2000/09/30".

In step SF3, the receiver-related control section 55 stores the information about the changed scheduled delivery date in "'scheduled delivery date" of the gift control database 120 (refer to FIG. 2C). In step SF4, the receiver-related control section 55 updates the gift list screen 260 shown in FIG. 17 and displays the gift list screen 260A shown in FIG. 21 on the output section of the receive-side client 301. In the gift list screen 260A, "scheduled delivery date" (netting portion in FIG. 2C) of gift information 261A1 is updated.

Moreover, to indefinitely postpone a scheduled delivery date, the receiver (Taro Akasaka) checks the check box of "scheduled delivery data is not designated" shown in FIG. 20 and then presses the decision button 292. In this case, the gift concerned is reserved as data until a scheduled delivery date is designated again. Moreover, a mark "-" denoting indefinite postponement of a scheduled delivery date is stored in "scheduled delivery date" of the gift control database 120 shown in FIG. 2C.

Figure 21:
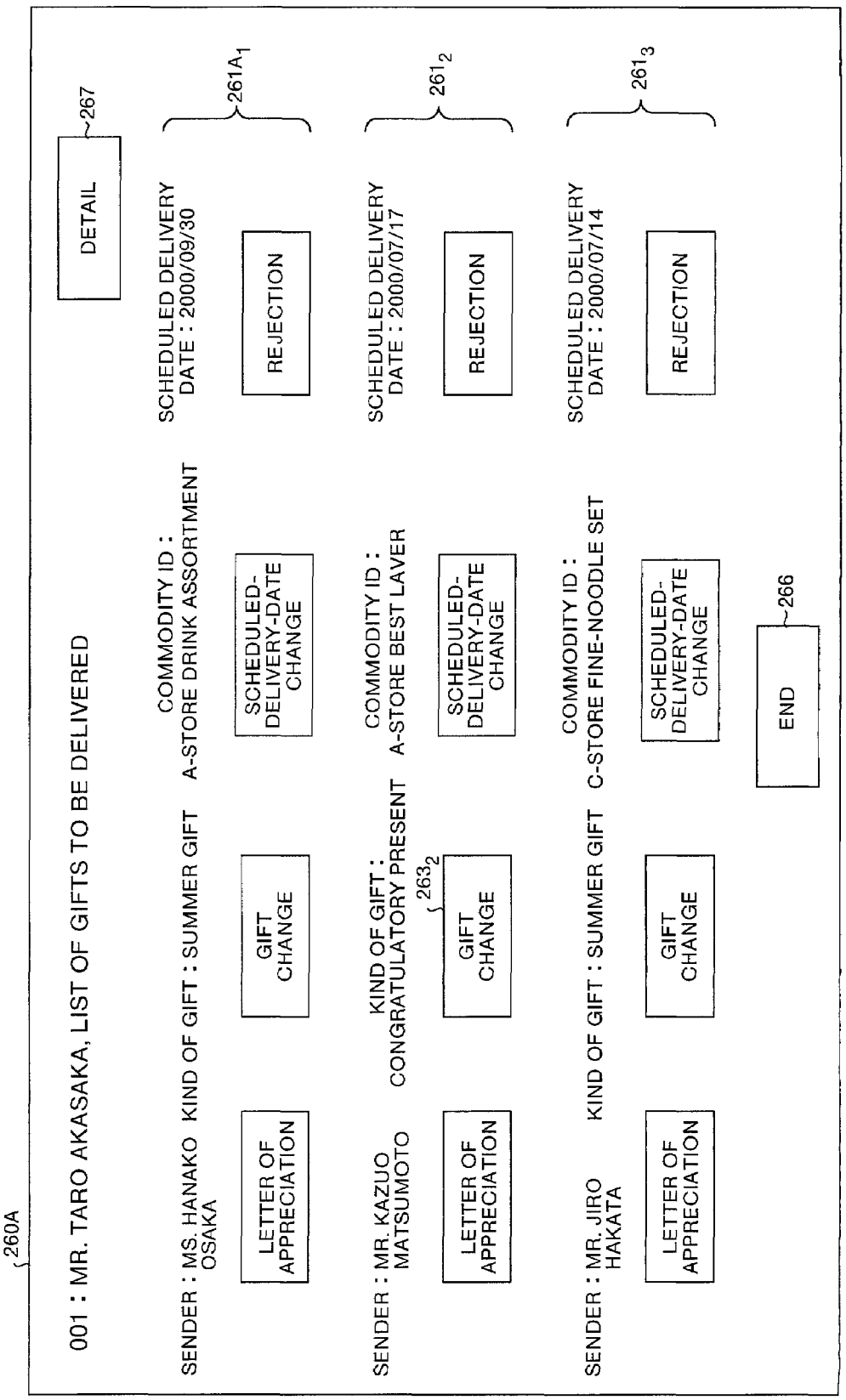
FIG. 21 is an illustration showing one of gift list screens 260A of the embodiment in FIG. 1.
Figure 22:
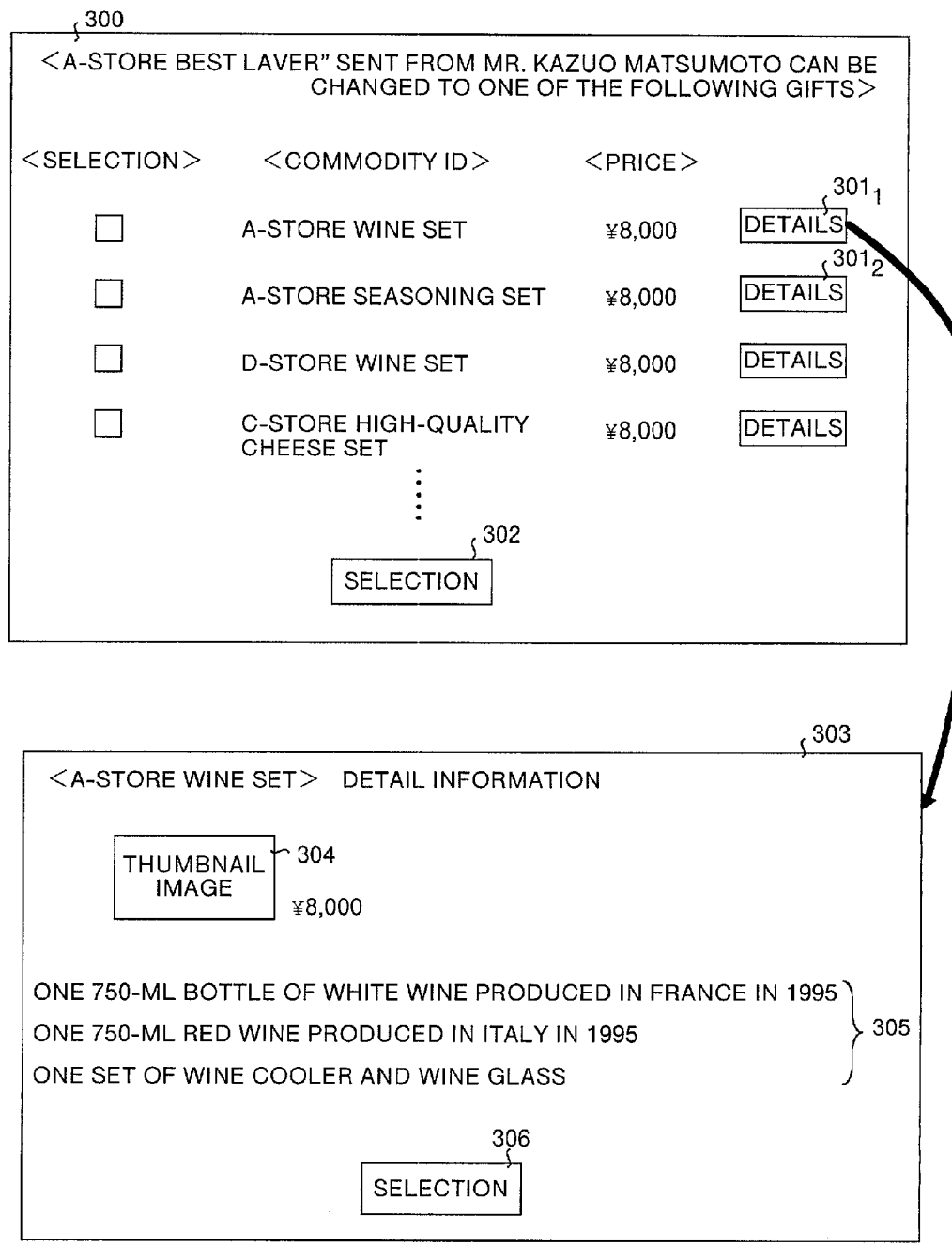
FIG. 22 is an illustration showing one of gift change screens 300 of the embodiment in FIG. 1.

Then, the receiver (Taro Akasaka) presses the gift change button 2632 shown in FIG. 21 in order to change the gift (commodity ID: A-store best layer) sent from the sender (Kazuo Matsumoto) shown in FIG. 21 to other gift. Thereby, the receiver-related control section 55 sets the determination result in step SC4 shown in FIG. 6 to "Yes". In step SC10, the receiver-related control section 55 executes the gift change.

Figure 8:
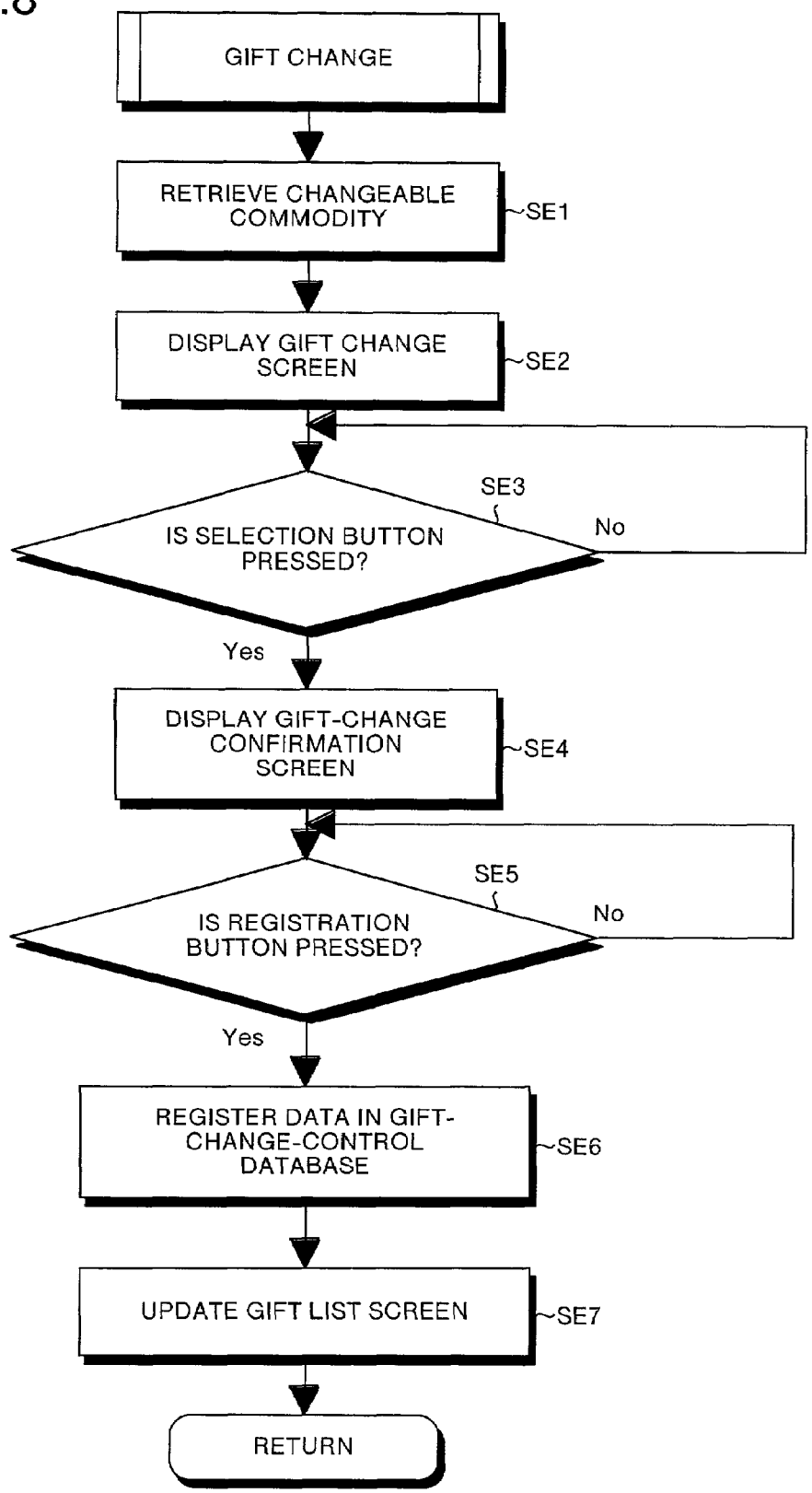
FIG. 8 is a flowchart for explaining the gift change in FIG. 6.
Figure 9:
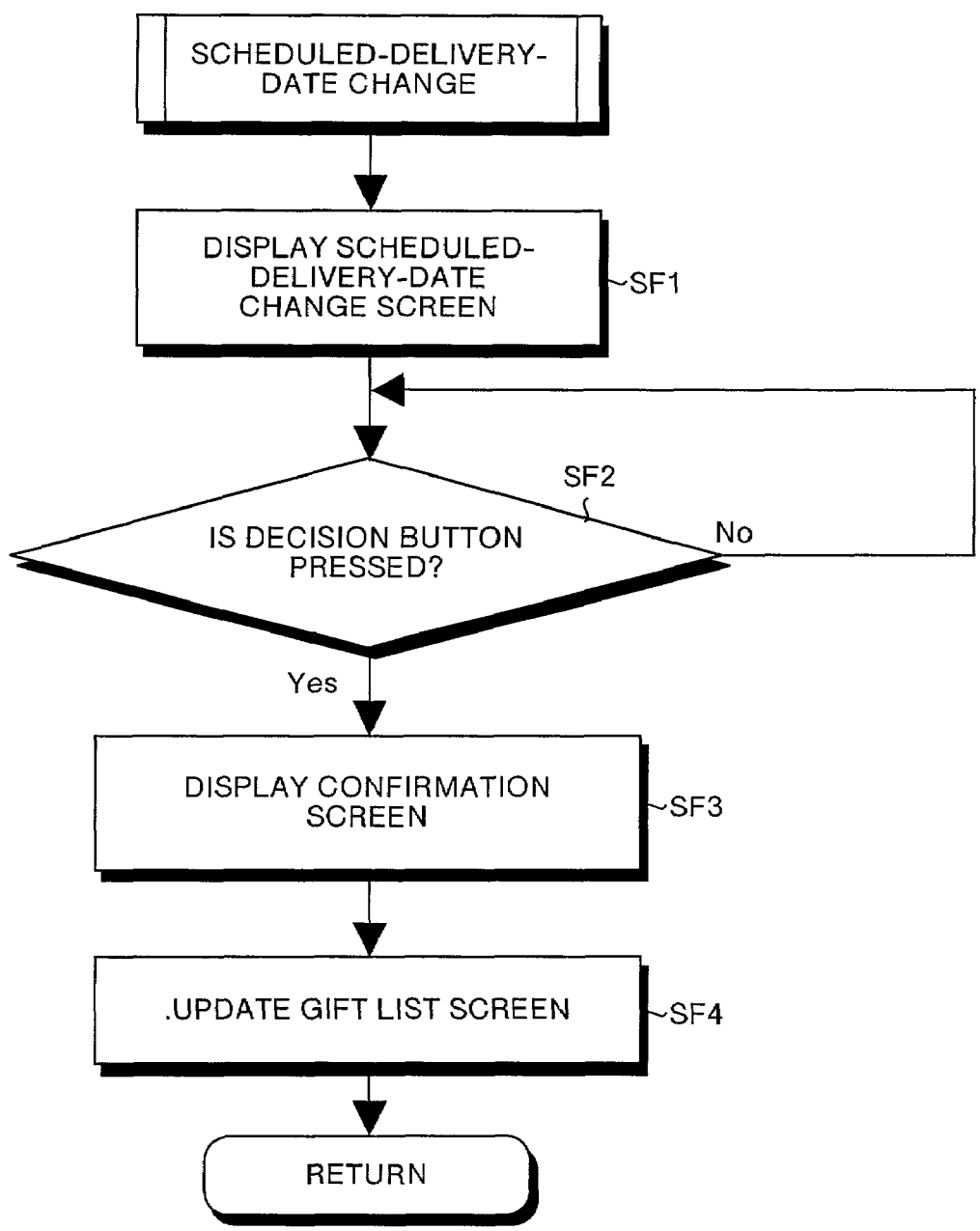
FIG. 9 is a flowchart for explaining the scheduled-delivery-date change in FIG. 6.

That is, in step SE1 shown in FIG. 8, the receiver-related control section 55 retrieves a changeable commodity (gift) out of the gift commodity database 110 by using the price of the gift concerned as a key. The changeable commodity is a commodity kept in the same price range as the gift concerned. In step SE2, the receiver-related control section 55 displays the gift change screen 300 shown in FIG. 22 on the output section of the receiver-side client 301.

Selection check boxes, commodity IDs about changeable commodities, prices, and detail buttons 3011 and 3012 are displayed on the gift change screen 300. When the detail button 3011 is pressed, the receiver-related control section 55 displays a detail information screen 303 about changeable commodities on the output section of the receiver-side client 301 in accordance with "specification", "thumbnail file", and "price" of the gift commodity database 110 (refer to FIG. 2B).

A thumbnail image 304, price, and specification 305 about A-store wine set are displayed on the detail information screen 303. In step SE3, the receiver-related control section 55 determines whether a selection button (the selection button 302 or 306) is pressed. When the determination result is "No", the receiver-related control section 55 repeats the above determination. In this case, when the selection button 306 is pressed, the receiver-related control section 55 sets the determination result in step SE3 to "Yes".

In step SE4, the receiver-related control section 55 displays a gift change confirmation screen (not illustrated) on the output section of the receiver-side client 301. The information about changed gifts and a registration button are displayed on the gift change confirmation screen. In step SE5, the receiver-related control section 55 determines whether the above registration button is pressed. When the determination result is "No", the receiver-related control section 55 repeats the above determination. In this case, when the registration button is pressed by the receiver (Taro Akasaka), the receiver-related control section 55 sets the determination result in step SE5 to "Yes".

In step SE6, the receiver-related control section 55 registers the information due to the above change in the gift change control database 130 shown in FIG. 3A. Moreover, the receiver-related control section 55 updates the gift control database 120 shown in FIG. 2C. In step SE7, the receiver-related control section 55 updates the gift list screen 260A shown in FIG. 21 and displays the gift list screen 260B shown in FIG. 23 on the output section of the receiver-side client 301. In the gift list screen 260B, "commodity ID" (netting portion in FIG. 23) of gift information 261B2 is updated to "A-store wine set".

Figure 23:
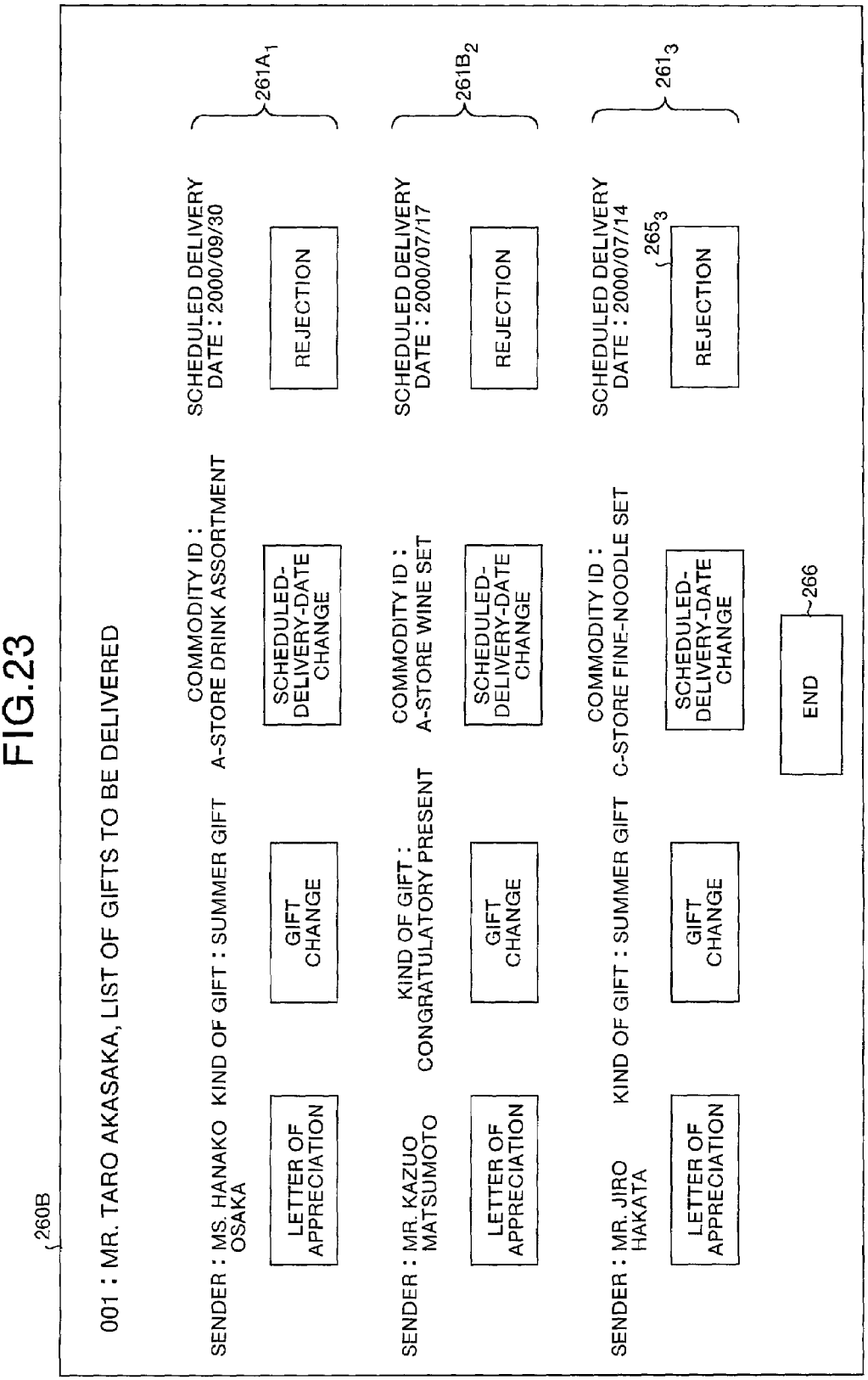
FIG. 23 is an illustration showing one of gift list screens 260B of the embodiment in FIG. 1.

Then, the receiver (Taro Akasaka) presses the rejection button 2653 in order to reject a gift sent from the sender (Jiro Hakata) shown in FIG. 23. Thereby, the receiver-related control section 55 sets the determination result in step SC6 shown in FIG. 6 to "Yes". In step SC12, the receiver-related control section 55 executes the rejection.

Figure 10:
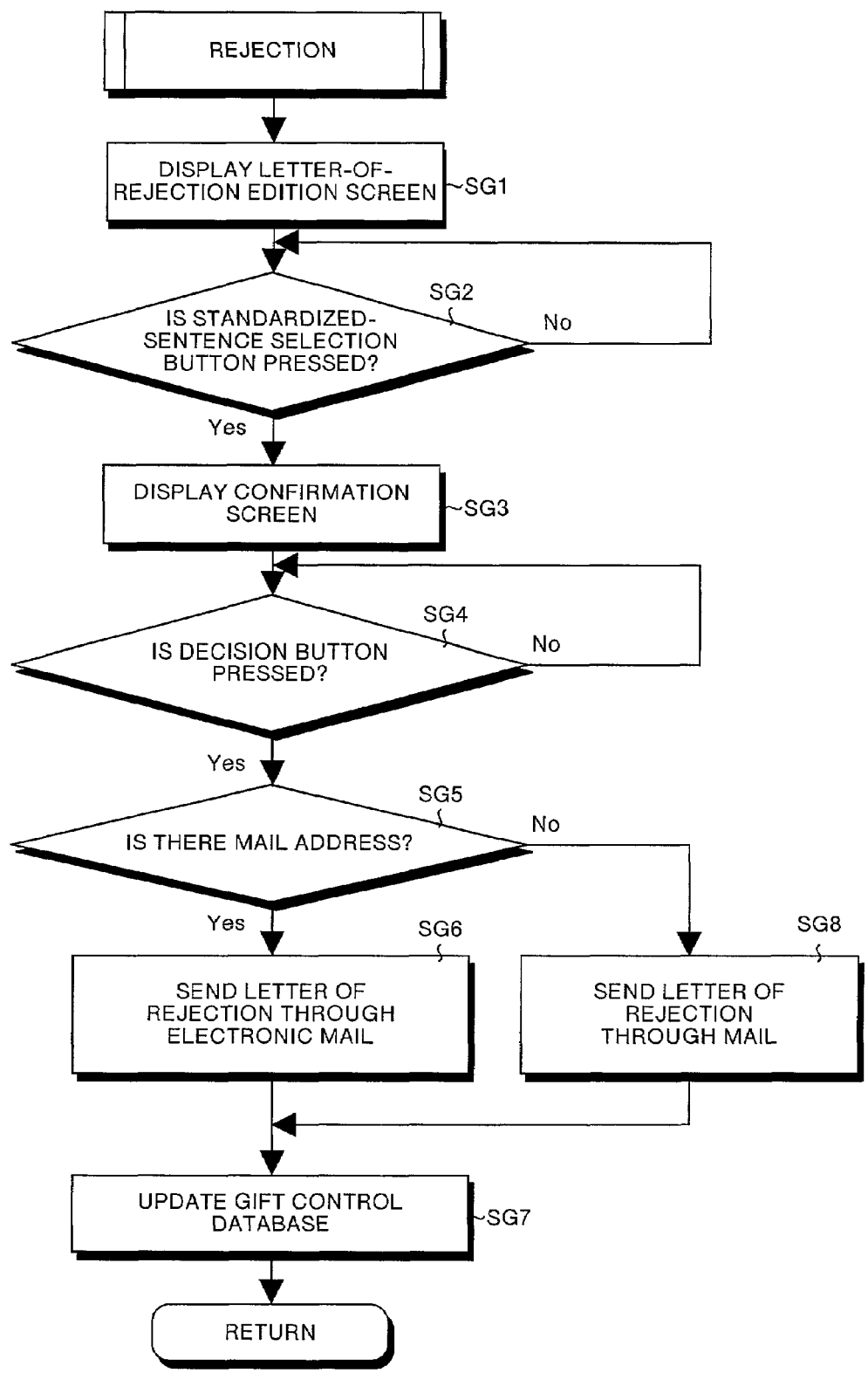
FIG. 10 is a flowchart for explaining the rejection in FIG. 6.

That is, in step SG1 shown in FIG. 10, the receiver-related control section 55 extracts standardized-sentence data corresponding to a letter of rejection from the letter of appreciation/rejection standardized-sentence database 140 shown in FIG. 3B and then, displays the letter-of-rejection edition screen 310 shown in FIG. 24 on the output section of the receiver-side client 301 in accordance with standardized-sentence data. The letter-of-rejection edition screen 310 is a screen for selecting a standardized sentence to be entered in a letter of rejection (return) addressed to the sender (Jiro Hakata) out of a plurality of standardized sentences 311. The standardized sentences 311 correspond to "standardized-sentence data" of the letter of appreciation/rejection standardized-sentence database 140 shown in FIG. 3B.

In step SG2, the receiver-related control section 55 determines whether a standardized-sentence selection button 312 is pressed after a standardized-sentence check box is checked. When the determination result is "No", the receiver-related control section 55 repeats the above determination. Then, when the checkbox of the standardized sentence "type 2: because this commodity cannot be accepted, . . . " is checked by the receiver (Taro Akasaka) and then, the standardized-sentence selection button 312 is pressed, the receiver-related control section 55 sets the determination result in step SG2 to "Yes".

In step SG3, the receiver-related control section 55 displays the confirmation screen 320 shown in FIG. 25 on the output section of the receiver-side client 301. The confirmation screen 320 is a screen for confirming the contents of a letter of rejection generated in accordance with the standardized sentence selected in step SG2. In this case, it is also possible to edit a displayed standardized sentence. In step SG4, the receiver-related control section 55 determines whether the decision button 321 is pressed by the receiver (Taro Akasaka). When the determination result is "No", the receiver-related control section 55 repeats the above determination.

In this case, when the decision button 321 is pressed, the receiver-related control section 55 sets the determination result in step SG4 to "Yes". In step SG5, the receiver-related control section 55 retrieves the member control database 100 to determine whether there is the mail address of the sender (Jiro Hakata).

In this case, when it is assumed that there is the mail address, the receiver-related control section 55 sets the determination result in step SG5 to "Yes". In step SG6, the mail-transceiving control section 57 sends the letter of rejection confirmed on the confirmation screen 320 to the sender-side client (Jiro Hakata). However, when the determination result in step SG5 is "No", the letter of rejection concerned is sent through a mail in step SG8.

In step SG7, the receiver-related control section 55 stores information in "letter of appreciation/rejection ID" of the gift control database 120 shown in FIG. 2C, stores a mark "O" in "rejection flag", and updates the gift control database 120. Moreover, the receiver-related control section 55 updates the gift list screen 260B shown in FIG. 23 and displays the gift list screen 260C shown in FIG. 26 on the output section of the receiver-side client 301. In the gift list screen 260C, gift information 2613 (refer to FIG. 23) is deleted.

Finally, when the detail screen button 267 shown in FIG. 26 is pressed by the receiver (Taro Akasaka), the receiver-related control section 55 sets the determination result in step SC7 shown in FIG. 6 to "Yes". In step SC13, the receiver-related control section 55 displays the detail screen 330 shown in FIG. 27 on the output section of the receiver-side client 301. Gift information and the history information about the above-described letter-of-appreciation acceptance, gift change, scheduled-delivery-date change, and rejection are displayed on the detail screen 330.

As described above, according to this embodiment, the gift-change-history information about a receiver is stored in the gift change control database 130 (refer to FIG. 3A) and the gift change history information is provided to a sender-side client when a gift is ordered. Therefore, it is possible to confirm the trend of the taste of the receiver in accordance with the gift change history information and thereby, avoid the waste of presenting an unnecessary gift and improve the convenience and profitability of a sender, receiver, and seller of a gift.

Moreover, the information about a best gift suitable for at least the receiver concerned is provided to a sender-side client when a gift is order in accordance with gift change history information. Therefore, it is possible to confirm a gift liked by a receiver and thereby, avoid the waste of presenting an unnecessary gift and improve the convenience and profitability of a sender, receiver, and seller of a gift.

Furthermore, the information about a worst gift not suitable for at least the receiver concerned is provided to a sender-side client when a gift is ordered in accordance with gift change history information. Therefore, it is possible to confirm a gift not liked by a receiver and thereby, avoid the waste of presenting an unnecessary gift and improve the convenience and profitability of a sender, receiver, and seller of a gift.

Furthermore, because a letter of appreciation to be sent from a receiver to a sender is accepted and the letter of appreciation is sent to a sender-side client (sender) through an electronic mail or a mail, it is possible to improve the convenience of the receiver.

Furthermore, because a letter of rejection for rejecting a gift sent from a sender is accepted and the letter of rejection is sent to a sender-side client (sender) through an electronic mail or a mail, it is possible to electronically record and control that a receiver does not securely receive the gift and reduce the mental burden of the receiver due to rejection of the gift and avoid wasteful delivery of the gift.

A preferred embodiment of the present invention is described above in detail by referring to the accompanying drawings. However, a specific configuration is not restricted to the embodiment. Design modifications are included in the present invention as long as the modifications are not deviated from the gist of the present invention. For example, in the case of the above embodiment, it is also allowed to record a gift mediating program for realizing the function of the server 50 in the computer-readable recording medium 500 shown in FIG. 28 and realize the function of the server 50 by making the computer 400 shown in FIG. 28 read the gift mediating program recorded in the recording medium 500 and executing the program.

Figure 28:
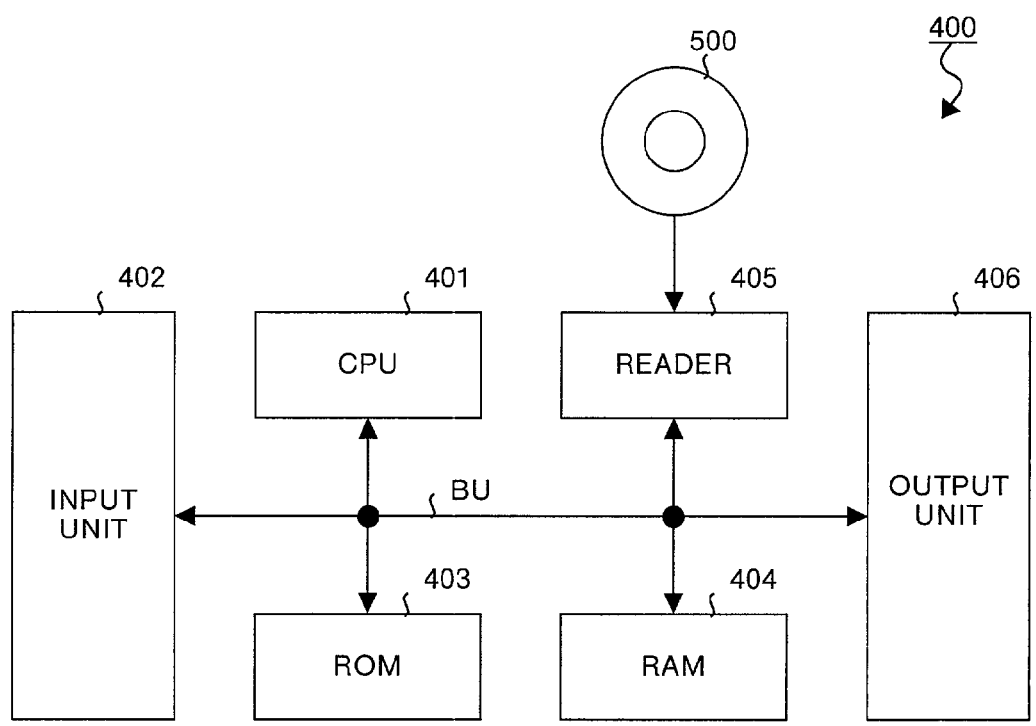
FIG. 28 is a block diagram showing a modification of the embodiment in FIG. 1.

The computer 400 shown in FIG. 28 is constituted of a CPU (Central Processing Unit) 401 for executing the gift mediating program, input units 402 such as a keyboard and a mouse, a ROM (Read Only Memory) 403 for storing various data values, a RAM 404 for storing operation parameters, a reader 405 for reading the gift mediating program from the recording medium 500, output units 406 such as a display and a printer, and a bus BU for connecting various sections of a system.

The CPU 401 realizes the function of the above server 50 by reading a gift mediating program recorded in the recording medium 500 via the reader 405 and then executing the program. The recording medium 500 includes not only portable recording media such as an optical disk, floppy disk, and hard disk but also a transmission medium for temporarily storing data such as a network.

As described above, according to one aspect of this invention, because the gift change information about a receiver is stored and provided for a sender-side client when a gift is ordered, it is possible to confirm the trend of the taste of a receiver in accordance with the gift change information. Therefore, advantages are obtained that it is possible to avoid the waste of presenting an unnecessary gift and improve the convenience and profitability of a sender, receiver, and seller of a gift.

According to another aspect of this invention, because the best gift information suitable for at least the receiver concerned is provided to a sender-side client when a gift is ordered in accordance with gift change information, it is possible to confirm a gift liked by the receiver. Therefore, advantages are obtained that it is possible to avoid the waste of presenting an unnecessary gift and improve the convenience and profitability of a sender, receiver, and seller of a gift.

According to still another aspect of this invention, because the worst-gift information not suitable for at least the receiver concerned is provided to a sender-side client when a gift is ordered in accordance with gift change information, it is possible to confirm a gift not liked by the receiver. Therefore, advantages are obtained that it is possible to avoid the waste of presenting an unnecessary gift and improve the convenience and profitability of a sender, receiver, and seller of a gift.

According to still another aspect of this invention, because a letter of appreciation sent from a receiver to a sender is accepted and sent to a sender-side client in the form of at least electronic data. Therefore, an advantage is obtained that it is possible to improve the convenience of a receiver.

According to still another aspect of this invention, a letter of rejection for rejecting a gift sent from a sender is accepted and sent to a sender-side client in the form of at least electronic data. Therefore, advantages are obtained that it is possible to electronically record and control that a receiver did not receive the gift concerned, reduce the mental burden of the receiver due to rejection of the gift, and avoid unnecessary delivery of the gift.

According to still another aspect of this invention, because the information about a gift suitable for the receiver concerned is received out of gift change information, it is possible to confirm a gift liked by a receiver. Therefore, advantages are obtained that it is possible to avoid the waste of presenting an unnecessary gift and improve the convenience and profitability of a sender, receiver, and seller of a gift.

According to still another aspect of this invention, because the information of a gift not suitable for the receiver concerned is received out of gift change information, it is possible to confirm a gift not liked by a receiver. Therefore, advantages are obtained that it is possible to avoid the waste of presenting an unnecessary gift and improve the convenience and profitability of a sender, receiver, and seller of a gift.

According to still another aspect of this invention, designation information showing that a letter of appreciation is sent from a receiver to a sender is transmitted. Therefore, an advantage is obtained that it is possible to improve the convenience of a receiver about sending of a letter of appreciation.

According to still another aspect of this invention, designation information showing that a gift sent from a sender is rejected is transmitted. Therefore, advantages are obtained that it is possible to reduce the mental burden of a receiver due to rejection of a gift and avoid unnecessary delivery.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method for electronically mediating an online gift before a sender places an order for a recipient, the method comprising:
    providing both gift information on the online gift suitable and not suitable for at least the recipient to the sender prior to receiving order information from the sender, the gift information being served as a criterion for the sender to select the online gift;
    displaying order information related to the online gift received from the sender to the recipient, the order information being information on the online gift and a delivery of the online gift;
    changing the order information when the recipient selects to change the order information;
    displaying the changed order information to the sender; and
    accumulating the order information and a changed order information,
    wherein the gift information is generated on the accumulated order information or changed order information and the providing includes deciding whether a portion of the gift information is opened to the sender based on corresponding flag information included in the gift information, the flag information being set by the recipient.

2. A computer computer program product embodied on a storage medium that implements on a computer a method for electronically mediating an online gift before a sender places an order for a recipient, the method comprising:
    providing both gift information on the online gift suitable and not suitable for at least the recipient to the sender prior to receiving order information from the sender, the gift information being served as a criterion for the sender to select the online gift;
    displaying order information related to the online gift received from the sender to the recipient, the order information being information on the online gift and a delivery of the online gift;
    changing the order information when the recipient selects to change the order information;
    displaying the changed order information to the sender; and
    accumulating the order information and a changed order information,
    wherein the gift information is generated on the accumulated order information or changed order information and the providing includes deciding whether a portion of the gift information is opened to the sender based on corresponding flag information included in the gift information, the flag information being set by the recipient.

3. A server for electronically mediating online gift before a sender places an order for a recipient, comprising:
    a gift information providing unit that provides both gift information on the online gift suitable and not suitable for at least the recipient to the sender prior to receiving order information from the sender, the gift information being served as a criterion for the sender to select the online gift;
    an order information displaying unit that displays an order information related to the online gift received from the sender to the recipient, the order information being information on the online gift and a delivery of the online gift;
    an order information changing unit that changes the order information changed by the recipient when the recipient selects to change the order information;
    a changed order information displaying unit that displays the changed order information to the sender; and
    an order information accumulating unit that accumulates the order information and a changed order information,
    wherein the gift information is generated on the accumulated order information or changed order information and the providing includes deciding whether a portion of the gift information is opened to the sender based on corresponding flag information included in the gift information, the flag information being set by the recipient.

* * * * *

UNITED STATES PATENT AND TRADEMARK OFFICE
CERTIFICATE OF CORRECTION

PATENT NO. : 7,174,307 B2
APPLICATION NO. : 09/785220
DATED : February 6, 2007
INVENTOR(S) : Noriko Sakai et al.

It is certified that error appears in the above-identified patent and that said Letters Patent is hereby corrected as shown below:

Column 20, Line 6, after "A computer" delete "computer". (Second Occurrence)

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,174,307 B2  Page 1 of 1
APPLICATION NO. : 09/785220
DATED : February 6, 2007
INVENTOR(S) : Noriko Sakai et al.

It is certified that error appears in the above-identified patent and that said Letters Patent is hereby corrected as shown below:

Title Page, Item (56) (Other Publications), Line 5, change "oportunity" to --opportunity--.

Signed and Sealed this

Twenty-second Day of July, 2008

JON W. DUDAS
*Director of the United States Patent and Trademark Office*